(12) United States Patent
 Willey et al.

(10) Patent No.: US 10,938,000 B2
(45) Date of Patent: Mar. 2, 2021

(54) ARRANGEMENT FOR BATTERY PACK PROTECTION DURING FLUID INGRESS

(71) Applicant: TTI (MACAO COMMERCIAL OFFSHORE) LIMITED, Macau (MO)

(72) Inventors: Brent M. Willey, Anderson, SC (US); Hossein Maleki, Duluth, GA (US); Ryan J. Marino, Greenville, SC (US)

(73) Assignee: TTI (MACAO COMMERCIAL OFFSHORE) LIMITED, Macau (MO)

( * ) Notice: Subject to any disclaimer, the term of this patent is extended or adjusted under 35 U.S.C. 154(b) by 15 days.

(21) Appl. No.: 16/296,099

(22) Filed: Mar. 7, 2019

(65) Prior Publication Data

US 2019/0280262 A1 Sep. 12, 2019

Related U.S. Application Data

(60) Provisional application No. 62/639,634, filed on Mar. 7, 2018.

(51) Int. Cl.
*H01M 2/10* (2006.01)
*H01M 2/20* (2006.01)
(Continued)

(52) U.S. Cl.
CPC ........... *H01M 2/1055* (2013.01); *H01M 2/20* (2013.01); *H01M 2/202* (2013.01); *H01M 2/204* (2013.01);
(Continued)

(58) Field of Classification Search
None
See application file for complete search history.

(56) References Cited

U.S. PATENT DOCUMENTS

| | | | |
|---|---|---|---|
| 5,998,967 A | 12/1999 | Umeki et al. | |
| 6,664,000 B1 * | 12/2003 | Sonobe | H01M 2/34 429/61 |

(Continued)

FOREIGN PATENT DOCUMENTS

| | | |
|---|---|---|
| EP | 2851973 A1 | 3/2015 |
| WO | 2018231987 A1 | 12/2018 |

OTHER PUBLICATIONS

European Patent Office Extended Search Report for related application No. 19161217.5 dated Jul. 24, 2019 (8 pages).

*Primary Examiner* — Scott J. Chmielecki
(74) *Attorney, Agent, or Firm* — Michael Best & Friedrich LLP

(57) ABSTRACT

An arrangement for battery pack protection during fluid ingress. The battery pack may include a housing, a terminal block, and a core battery assembly supported in the housing, the assembly including a core housing, a plurality of battery cells supported in the core housing, a first weld strap connecting the battery cells to a positive power terminal, a second weld strap connecting the battery cells to a negative power terminal, a first sacrificial electrode connected to the first weld strap, and a second sacrificial electrode connected to the second weld strap. A spacing between the first sacrificial electrode and the second sacrificial electrode may be selected such that an ingress fluid entering the battery pack electrically shorts the first sacrificial electrode and the second sacrificial electrode to drop a voltage of the cell battery assembly and discharge battery energy before damaging the battery cells.

20 Claims, 26 Drawing Sheets

(51) Int. Cl.
*H01M 2/30* (2006.01)
*H01M 10/44* (2006.01)

(52) U.S. Cl.
CPC ............ *H01M 2/30* (2013.01); *H01M 10/44* (2013.01); *H01M 10/441* (2013.01); *H01M 2200/00* (2013.01); *H01M 2220/30* (2013.01)

(56) References Cited

U.S. PATENT DOCUMENTS

| | | |
|---|---|---|
| 8,081,000 B2 | 12/2011 | Kasamatsu et al. |
| 8,734,972 B2 | 5/2014 | Maeba et al. |
| 9,281,703 B2 | 3/2016 | Abd Elhamid et al. |
| 9,312,702 B2 | 4/2016 | Wang et al. |
| 2002/0125342 A1* | 9/2002 | Matsuzawa ......... F04B 43/0736 239/533.2 |
| 2011/0127945 A1* | 6/2011 | Yoneda ................... H01M 2/34 320/101 |
| 2017/0365826 A1 | 12/2017 | Varipatis et al. |
| 2018/0198294 A1* | 7/2018 | Sheeks ................. G01R 31/392 |
| 2018/0301302 A1* | 10/2018 | Furuuchi ............... H01H 35/18 |

* cited by examiner

ARRANGEMENT FOR BATTERY PACK PROTECTION DURING FLUID INGRESS

CROSS-REFERENCE TO RELATED APPLICATION

This application claims priority to U.S. Provisional Patent Application No. 62/639,634 filed on Mar. 7, 2018, the entire contents of which are hereby incorporated by reference.

FIELD

The present invention generally relates to battery packs for power tools, outdoor tools, other electrical devices, etc., and, more particularly, to arrangements for chemically-corrosive and/or electrically-corrosive fluid ingress protection for battery packs.

SUMMARY

In case of ingress of an electrically-conductive and/or chemically-corrosive fluid or moisture (e.g., salt water, salt fog, etc.; referred to as an "ingress fluid") into a battery pack, the ingress fluid may short circuit the battery cells. When the battery cells hold a charge, this short circuit may cause overheating in and/or irreversible damage to the battery cells and the battery pack. For example, depending on voltages of the battery cells, corrosion status, extent of a short circuit between one or more battery weld straps and battery cells, etc., shorting may cause corrosion, overheating in the battery cells, thermal runaway, meltdown of the battery housing, etc.

In one independent embodiment, a battery pack may generally include a housing; a terminal block; and a core battery assembly supported in the housing. The core battery assembly may include a core housing, a plurality of battery cells supported in the core housing, a first weld strap connecting the plurality of battery cells to a positive power terminal, a second weld strap connecting the plurality of battery cells to a negative power terminal, a first sacrificial electrode connected to the first weld strap, and a second sacrificial electrode connected to the second weld strap. A spacing between the first sacrificial electrode and the second sacrificial electrode may be selected such that an ingress fluid entering the battery pack electrically shorts the first sacrificial electrode and the second sacrificial electrode to drop a voltage of the cell battery assembly and discharge battery energy before damaging the battery cells.

In some constructions, the spacing may be between about 4 millimeters (mm) and about 11 mm. In some constructions, the spacing is at least about 6 mm to about 8 mm. In some constructions, each of the first sacrificial electrode and the second sacrificial electrode have a width, and each width may be between about 10 mm and about 35 mm (e.g., at least about 27.5 mm). In some constructions, each of the first sacrificial electrode and the second sacrificial electrode have a length, and each length may be between about 80 mm and about 110 mm (e.g., between about 90 mm and about 100 mm).

The construction (e.g., the width, length, thickness, geometry, material(s), etc.) of the sacrificial electrodes may be adjusted based on, for example, the type(s), design, energy density, etc., of the battery cells, the battery cores, the battery housing, etc. In one example, the sacrificial electrodes are designed to protect the battery pack by reducing the voltages of the battery cells below critical limits specific to cell design and chemistry (e.g., reduce the voltage for any Lithium-based chemistry cells operating between about 2.0 volts (V) to about 4.5 V to less than about 3.0 V). The sacrificial electrode material types may include electrically-conductive single, compound, or alloy elements or combinations thereof (e.g., Zn, Sn, Ni, Fe, Cr, Al, Cu. NiCu, NiCr, CuSn, FeCr, NiAl, CuMg, CuCr, SnZn).

In some constructions, the first sacrificial electrode and the second sacrificial electrode may be positioned outside of the core housing. In some constructions, the first sacrificial electrode and the second sacrificial electrode may be positioned substantially inside of the core housing. In some constructions, a sacrificial electrode may be an independent extension of a battery weld strap.

In another independent embodiment, a battery pack may generally include a housing; a terminal block; and a core battery assembly supported in the housing. The core battery assembly may include a core housing, a plurality of battery cells supported in the core housing, a first weld strap connecting the plurality of battery cells to a positive power terminal, a second weld strap connecting the plurality of battery cells to a negative power terminal, a first sacrificial electrode connected to the first weld strap, and a second sacrificial electrode connected to the second weld strap. A spacing between the first sacrificial electrode and the second sacrificial electrode may be between about 4 millimeters (mm) and about 11 mm.

In yet another independent embodiment, a battery pack may generally include a housing; a terminal block; and a core battery assembly supported in the housing. The core battery assembly may include a core housing, a plurality of battery cells supported in the core housing, a first weld strap connecting the plurality of battery cells to a positive power terminal, a second weld strap connecting the plurality of battery cells to a negative power terminal, a first sacrificial electrode connected to the first weld strap, and a second sacrificial electrode connected to the second weld strap. A spacing between the first sacrificial electrode and the second sacrificial electrode may be selected such that an ingress fluid entering the battery pack electrically shorts the first sacrificial electrode and the second sacrificial electrode to drop a voltage of the cell battery assembly and discharge battery energy before damaging the battery cells. The first sacrificial electrode and the second sacrificial electrode may be positioned substantially inside of the core housing.

Other independent aspects of the invention may become apparent by consideration of the detailed description, claims and accompanying drawings.

DETAILED DESCRIPTION

Figure 1:
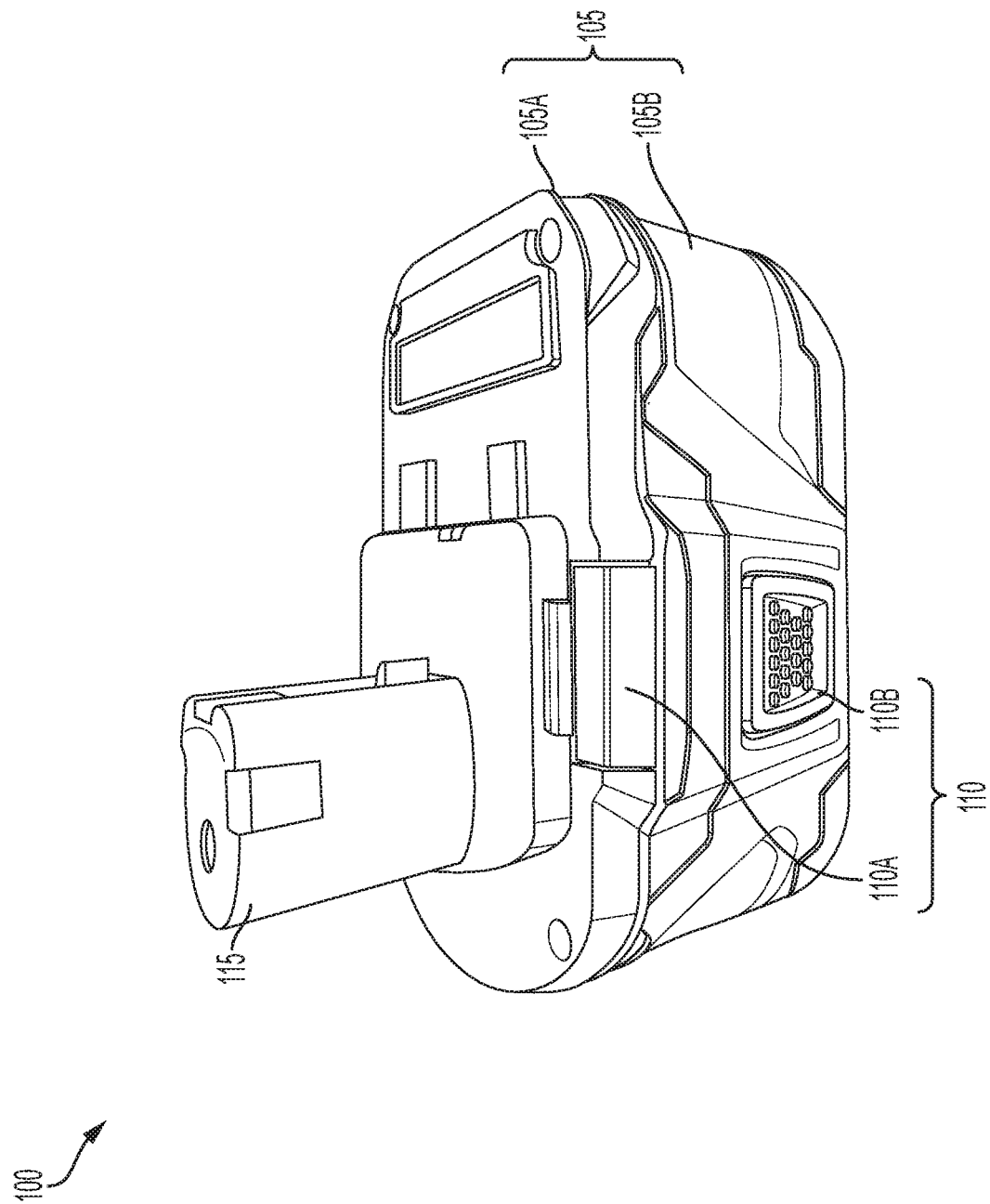
FIG. 1 is a perspective view of a battery pack.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting.

Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof. Unless specified or limited otherwise, the terms "mounted," "connected," "supported," and "coupled" and variations thereof are used broadly and encompass both direct and indirect mountings, connections, supports, and couplings.

Relative terminology, such as, for example, "about", "approximately", "substantially", etc., used in connection with a quantity or condition would be understood by those of ordinary skill to be inclusive of the stated value or condition and has the meaning dictated by the context (for example, the term includes at least the degree of error associated with the measurement of, tolerances (e.g., manufacturing, assembly, use, etc.) associated with the particular value or condition, etc.). Such terminology should also be considered as disclosing the range defined by the absolute values of the two endpoints. For example, the expression "from about 2 to about 4" also discloses the range "from 2 to 4". The relative terminology may refer to plus or minus a percentage (e.g., 1%, 5%, 10% or more) of an indicated value.

Also, the functionality described herein as being performed by one component may be performed by multiple components in a distributed manner. Likewise, functionality performed by multiple components may be consolidated and performed by a single component. Similarly, a component described as performing particular functionality may also perform additional functionality not described herein. For example, a device or structure that is "configured" in a certain way is configured in at least that way but may also be configured in ways that are not listed.

Furthermore, some embodiments described herein may include one or more electronic processors configured to perform the described functionality by executing instructions stored in non-transitory, computer-readable medium. Similarly, embodiments described herein may be implemented as non-transitory, computer-readable medium storing instructions executable by one or more electronic processors to perform the described functionality. As used in the present application, "non-transitory computer-readable medium" comprises all computer-readable media but does not consist of a transitory, propagating signal. Accordingly, non-transitory computer-readable medium may include, for example, a hard disk, a CD-ROM, an optical storage device, a magnetic storage device, a ROM (Read Only Memory), a RAM (Random Access Memory), register memory, a processor cache, or any combination thereof.

Many of the modules and logical structures described are capable of being implemented in software executed by a microprocessor or a similar device or of being implemented in hardware using a variety of components including, for example, application specific integrated circuits ("ASICs"). Terms like "controller" and "module" may include or refer to both hardware and/or software. Capitalized terms conform to common practices and help correlate the description with the coding examples, equations, and/or drawings. However, no specific meaning is implied or should be inferred simply due to the use of capitalization. Thus, the claims should not be limited to the specific examples or terminology or to any specific hardware or software implementation or combination of software or hardware.

Figure 2:
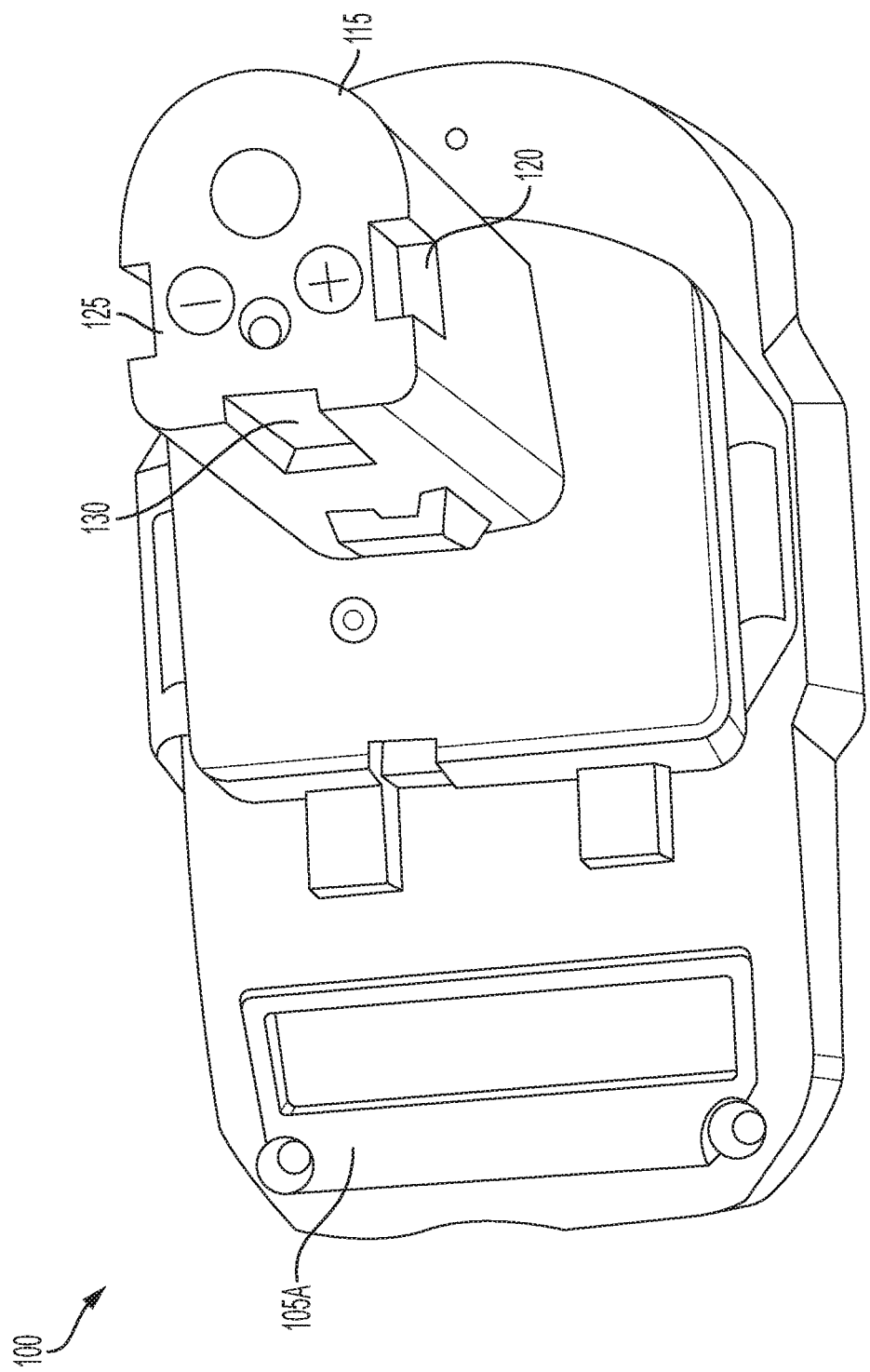
FIG. 2 is a top perspective view of the battery pack of FIG. 1.

With reference to FIGS. 1-2, a battery pack 100 includes a housing 105 with a first or top housing portion 105A and a second bottom housing portion 105B. The battery pack 100 is configured to be attached to and provide operating power to an electrical device (not shown), such as a power tool, an outdoor tool or other motorized or non-motorized electrical device. The battery pack 100 is also connectable to a battery charger (not shown).

To facilitate connection to the electrical device, a latch system 110, including a latch 110A and an actuator 110B, is provided on each side of the battery pack 100. When the battery pack 100 is supported on the electrical device, the latch 110A engages a corresponding structure in the electrical device to prevent inadvertent disconnection of the battery pack 100. The battery pack 100 may be released when a user actuates the actuator 110B and pulls the battery pack 100 from the electrical device. With the illustrated tower-style configuration, only the top housing portion 105A may be received in the electrical device or the battery charger while the bottom housing portion 105B extends from the electrical device or the battery charger.

The top housing portion 105A also supports a terminal block 115 to provide electrical connection to the electrical device or the battery charger. The terminal block 115 includes a positive power terminal 120 and a negative power terminal 125. In some embodiments, the terminal block 115 may also include one or more communication/data terminals 130 (one shown).

Figure 3:
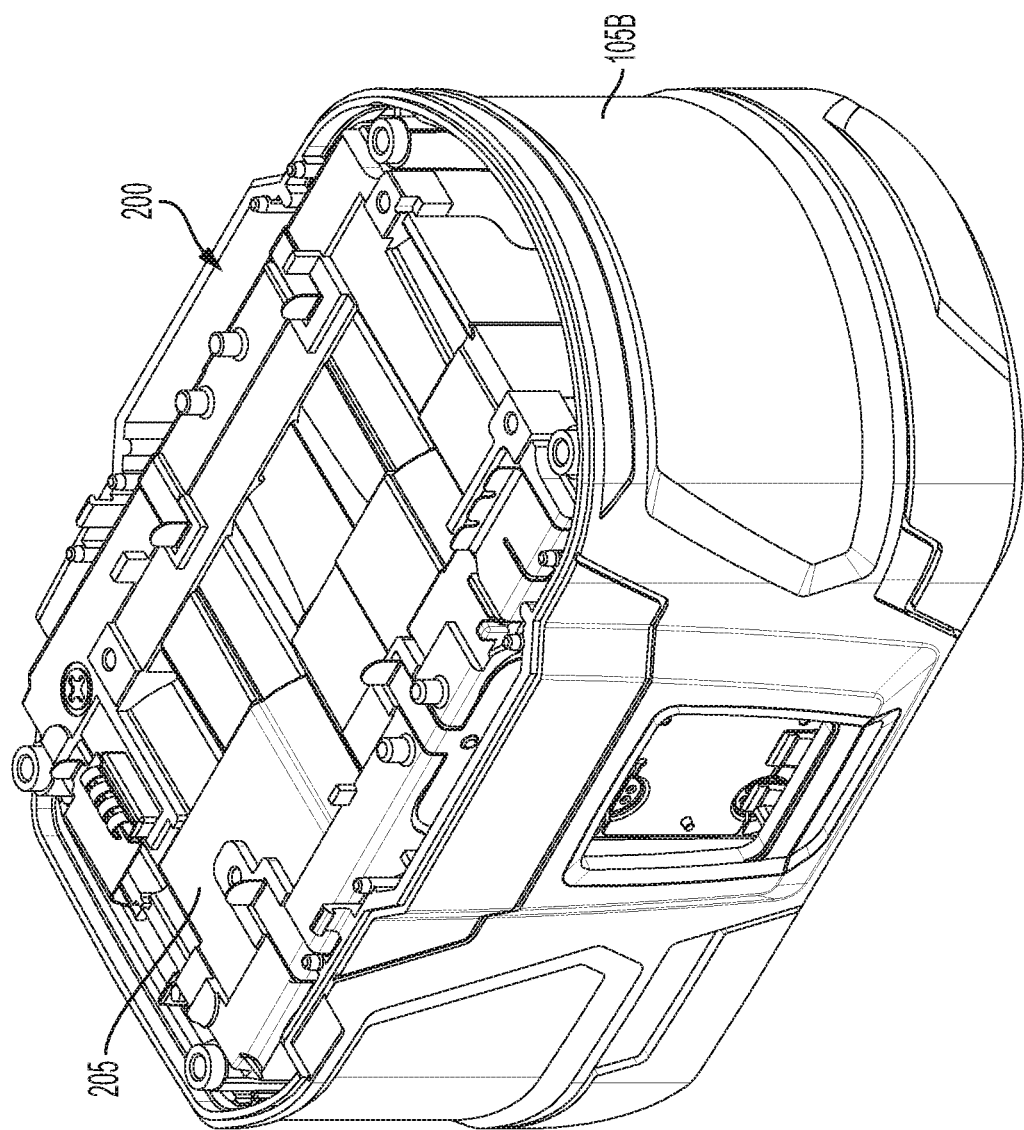
FIG. 3 is a top perspective view of the battery pack of FIG. 1 with the top housing removed.
Figure 4:
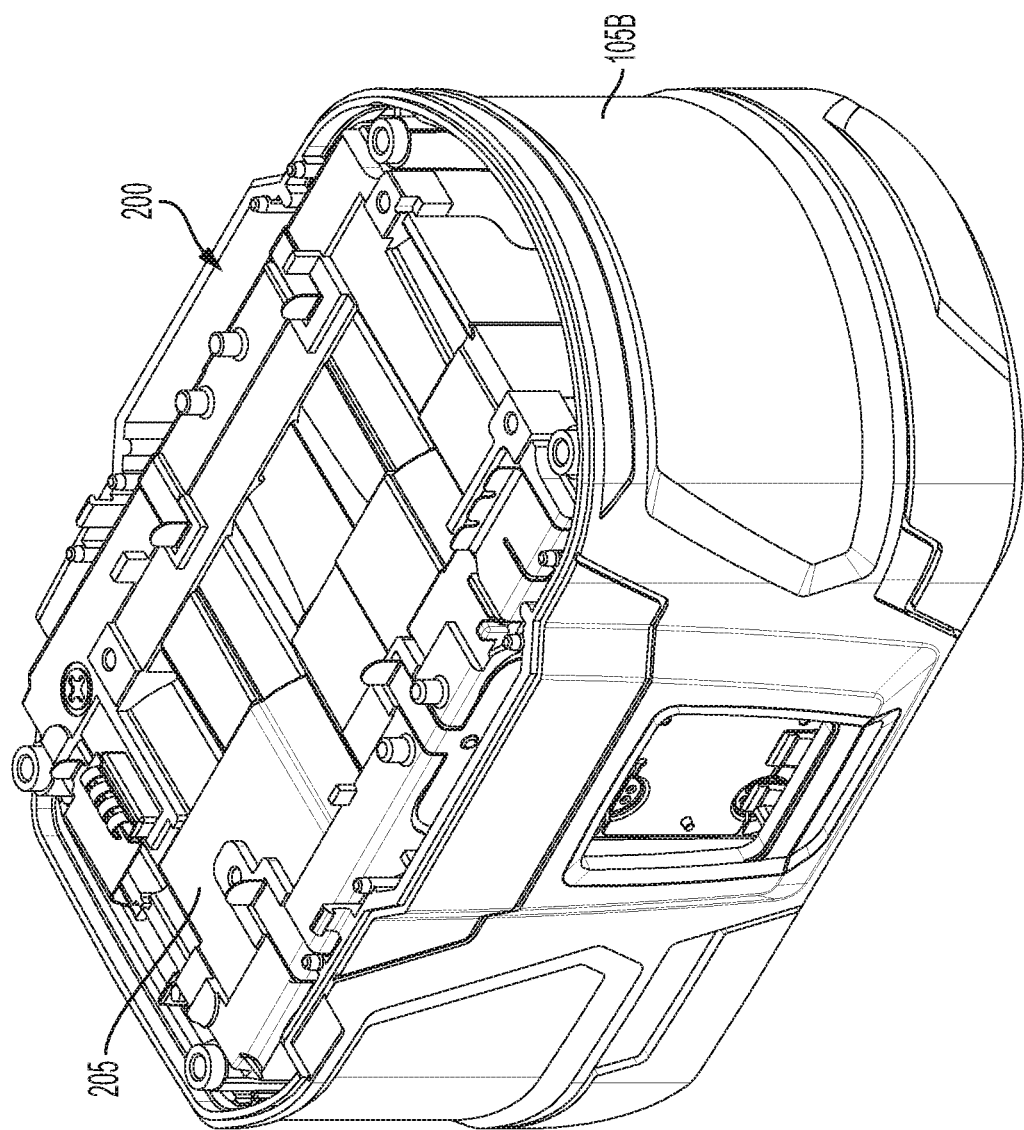
FIG. 4 is another top perspective view of the portion of the battery pack as shown in FIG. 3.
Figure 5:
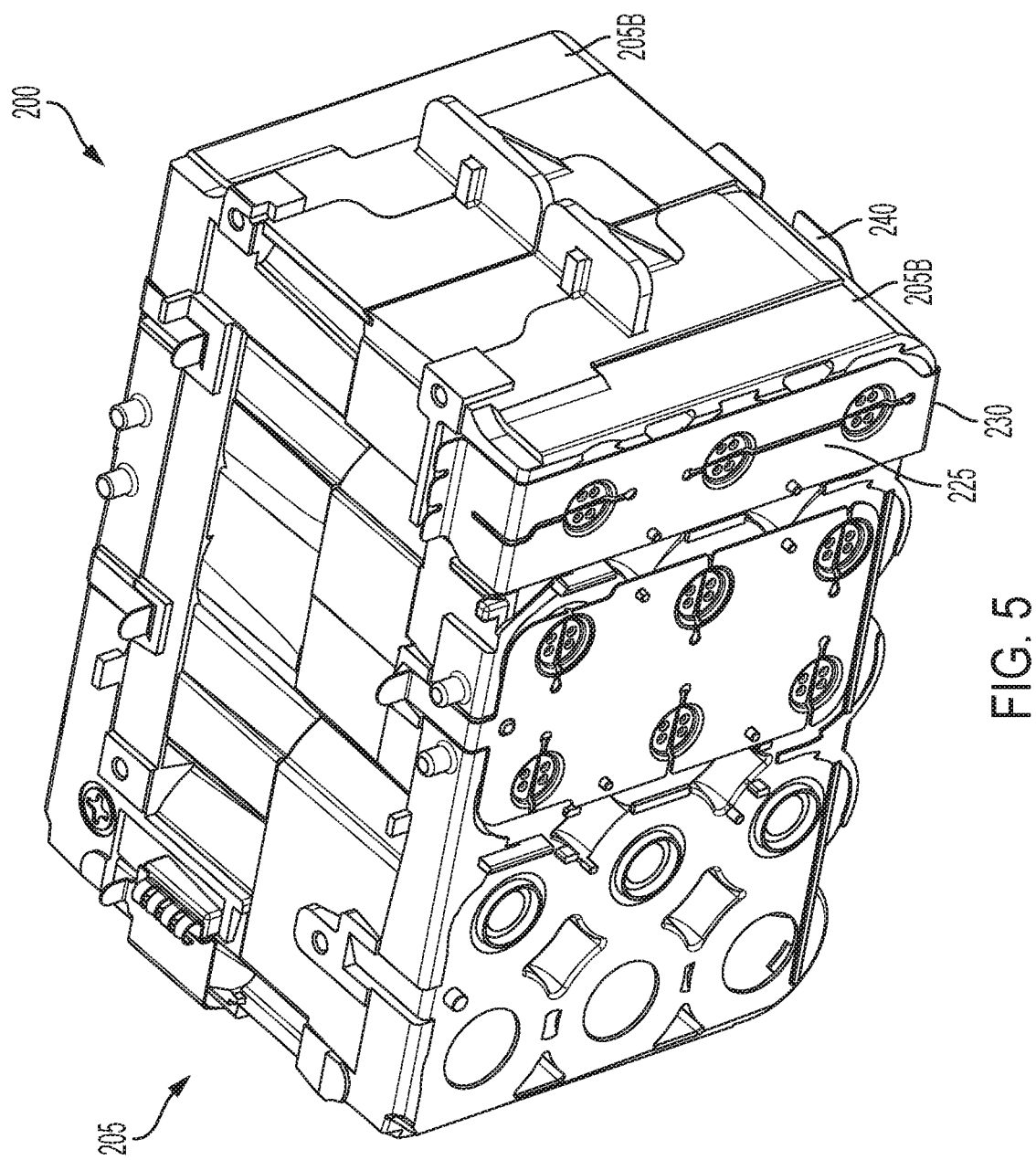
FIG. 5 is a bottom perspective view of the core battery assembly of the battery pack as shown in FIG. 3.

FIGS. 3-4 illustrate a core battery assembly 200 supported in the housing 105 (with the top housing portion 105A removed). As shown in FIG. 5, the core battery assembly 200 includes a core housing 205 (e.g., housing halves 205A, 205B) supporting (e.g., at least partially enclosing) a plurality of battery cells 210 (see FIGS. 20-24). In the illustrated construction, the battery pack 100 includes three parallel-connected strings of five series-connected battery cells 210 for a total of fifteen battery cells 210. That is, the battery cells 210 are arranged in a 5S3P configuration. However, the battery pack 100 may include other configurations and combinations of battery cells 210, such as, for example, 5S1P, 5S2P, 10S1P, etc.

Each battery cell 210 may have a nominal voltage between about 2.5 V and about 5 V. The battery pack 100 may have a nominal capacity between about 3 Amp-hours (Ah) (e.g., for a 5S1P pack) and about 6 Ah (e.g., for a 5S2P pack) or more (e.g., up to about 9 Ah for a 5S3P pack). The battery cells 210 may be any rechargeable battery cell chemistry type, such as, for example, Lithium, (Li), Lithium-metal, Lithium-ion (Li-ion), other Lithium-based chemistry, Nickel-Cadmium (NiCd), Nickel-Metal Hydride (NiMH), etc.

A printed circuit board (PCB; not shown) is provided on a top side of the core housing 205. The PCB includes various electronics of the battery pack 100. For example, the PCB includes a battery pack controller, a current sensor, a voltage sensor, charge and discharge FETs, etc. The power terminals 120, 125 extend from the PCB into the terminal block 115 of the battery pack 100.

Figure 6:
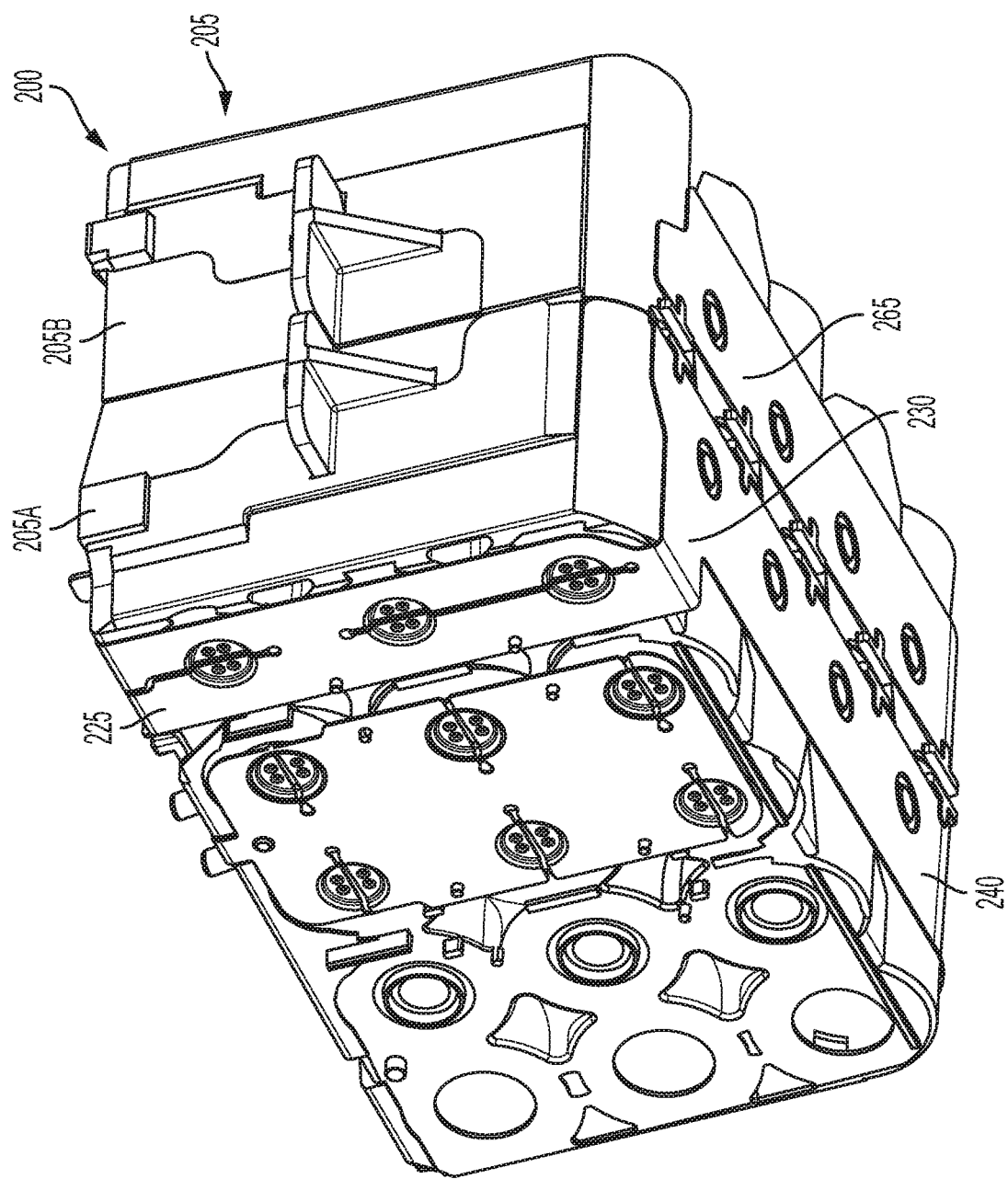
FIG. 6 is a top perspective view of the core battery assembly of FIG. 5.

Electrically-conductive weld strap materials are used to make connections between each battery cell 210 and between battery cells 210 and the power terminals 120, 125. With reference to FIGS. 5-6, a first weld strap 225 is connected to the most positive battery cells 210A. The first weld strap 225 includes an extended portion 230 that extends from the first side on which the first weld strap 225 is located to an adjacent side (the bottom side) of the core housing 205. A first lead wire (not shown) connects the first weld strap 225 to the positive power terminal 120.

A first sacrificial electrode 240 is connected (e.g., formed with (as shown), welded, etc.) to the extended portion 230 on the bottom side of the core housing 205. The first sacrificial electrode 240 extends along the bottom side of the core housing 205 (see FIG. 5). The strap 225, the extended portion 230 and the sacrificial electrode 240 form a unitary strap/electrode assembly.

Figure 7:
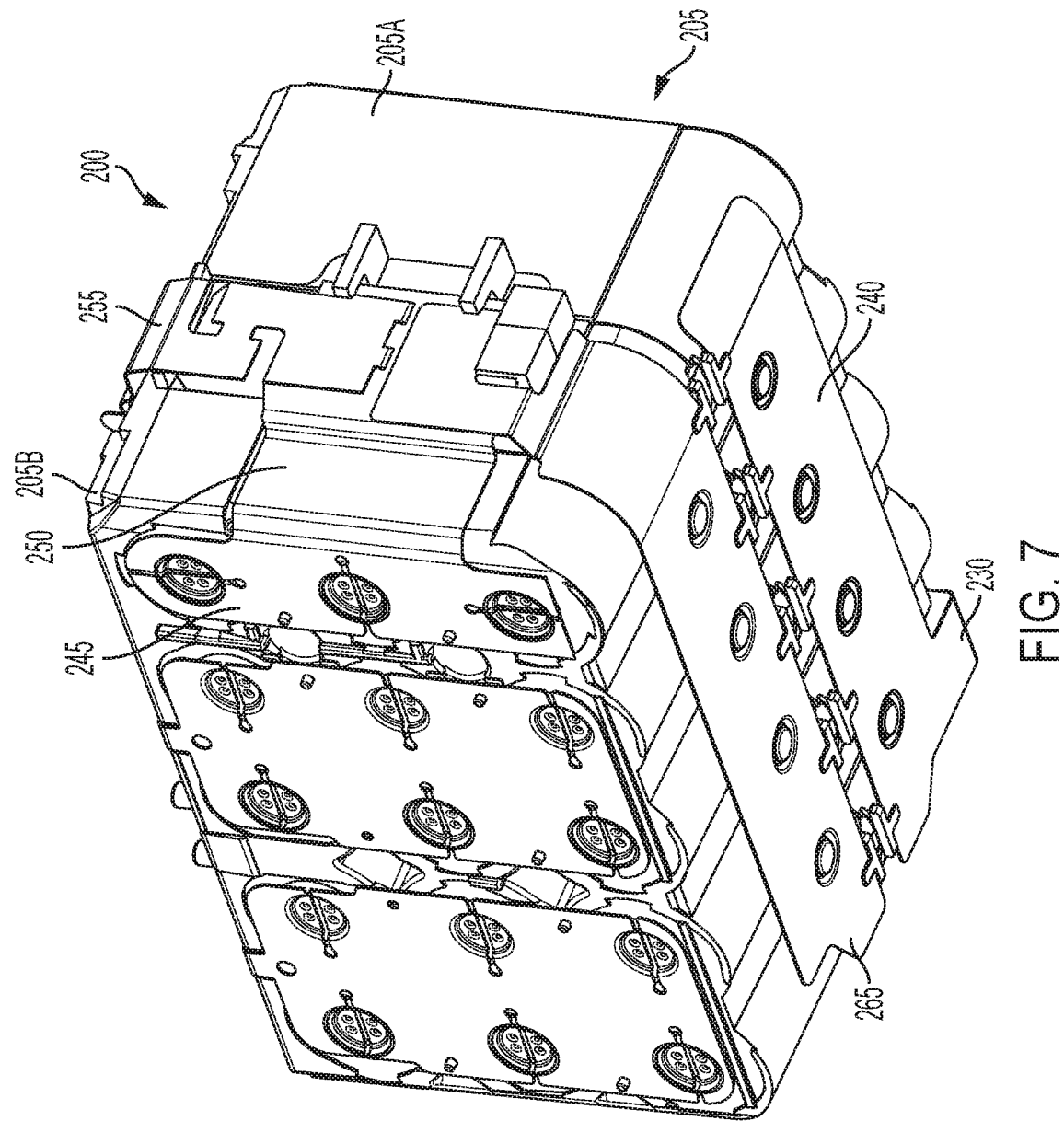
FIG. 7 is another top perspective view of the core battery assembly of FIG. 5 with a strap removed.
Figure 8:
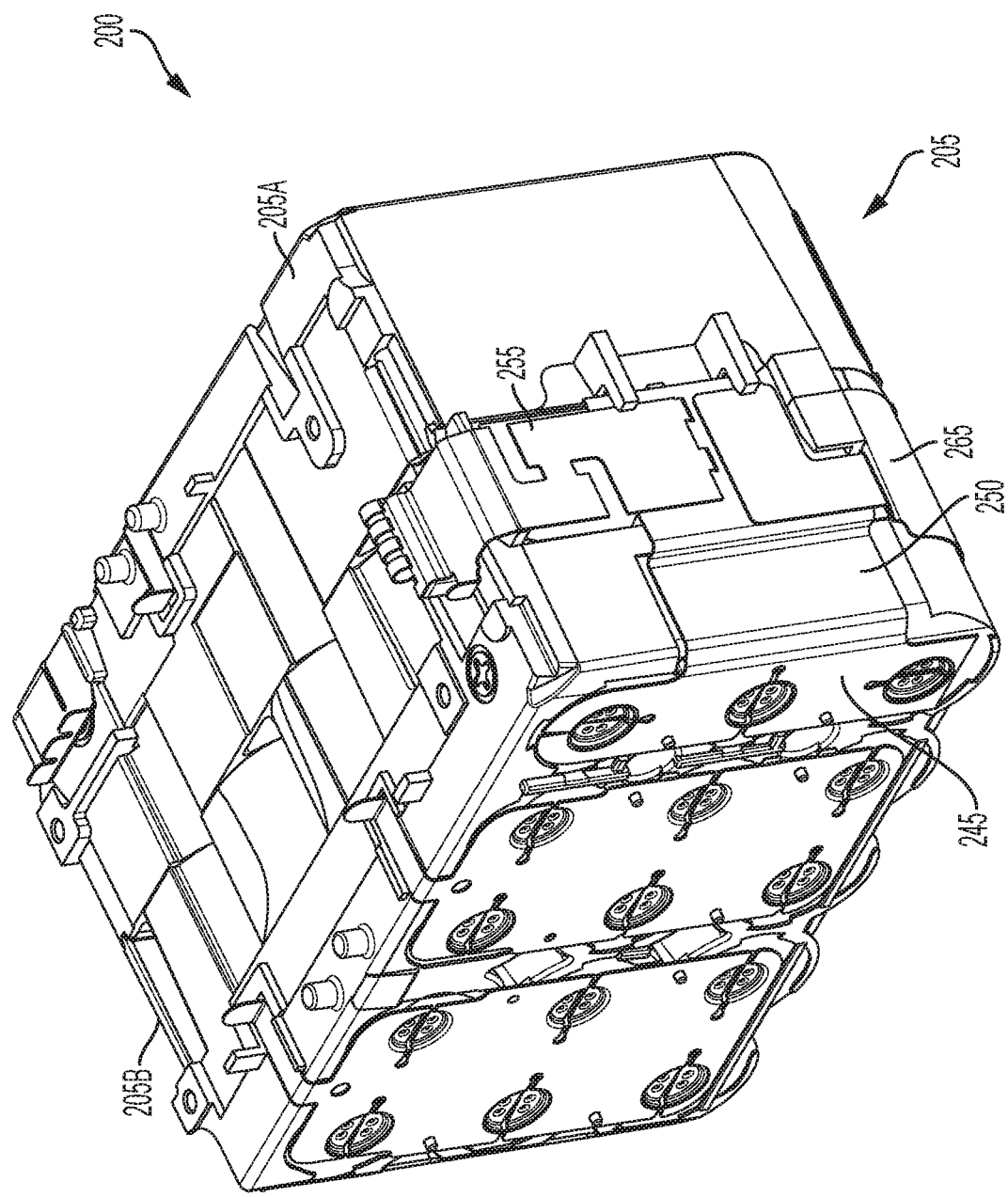
FIG. 8 is another bottom perspective view of the core battery assembly as shown in FIG. 7.
Figure 9:
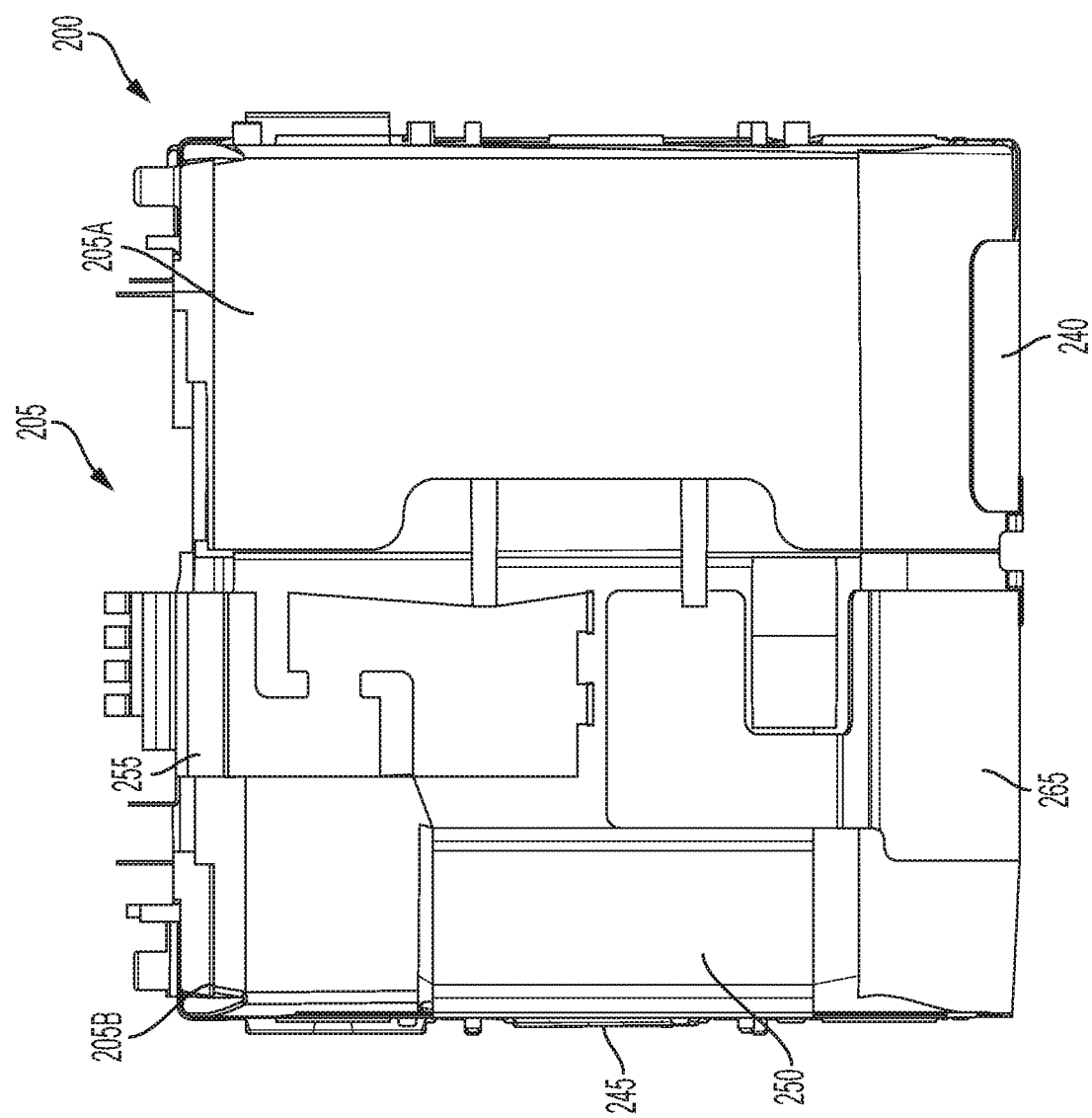
FIG. 9 is a front view of the core battery assembly of FIG. 5.
Figure 10:
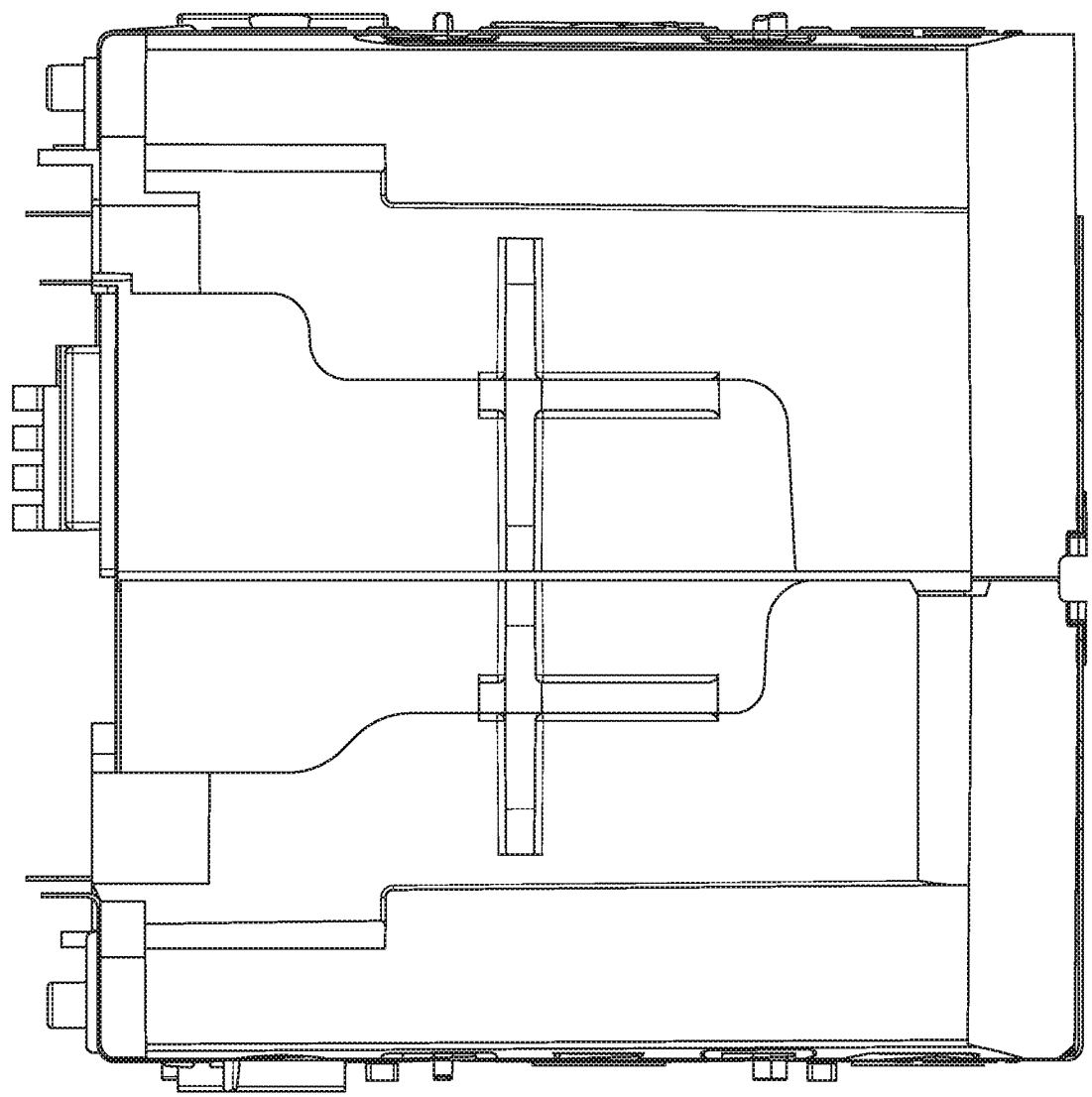
FIG. 10 is a rear view of the core battery assembly of FIG. 5.
Figure 11:
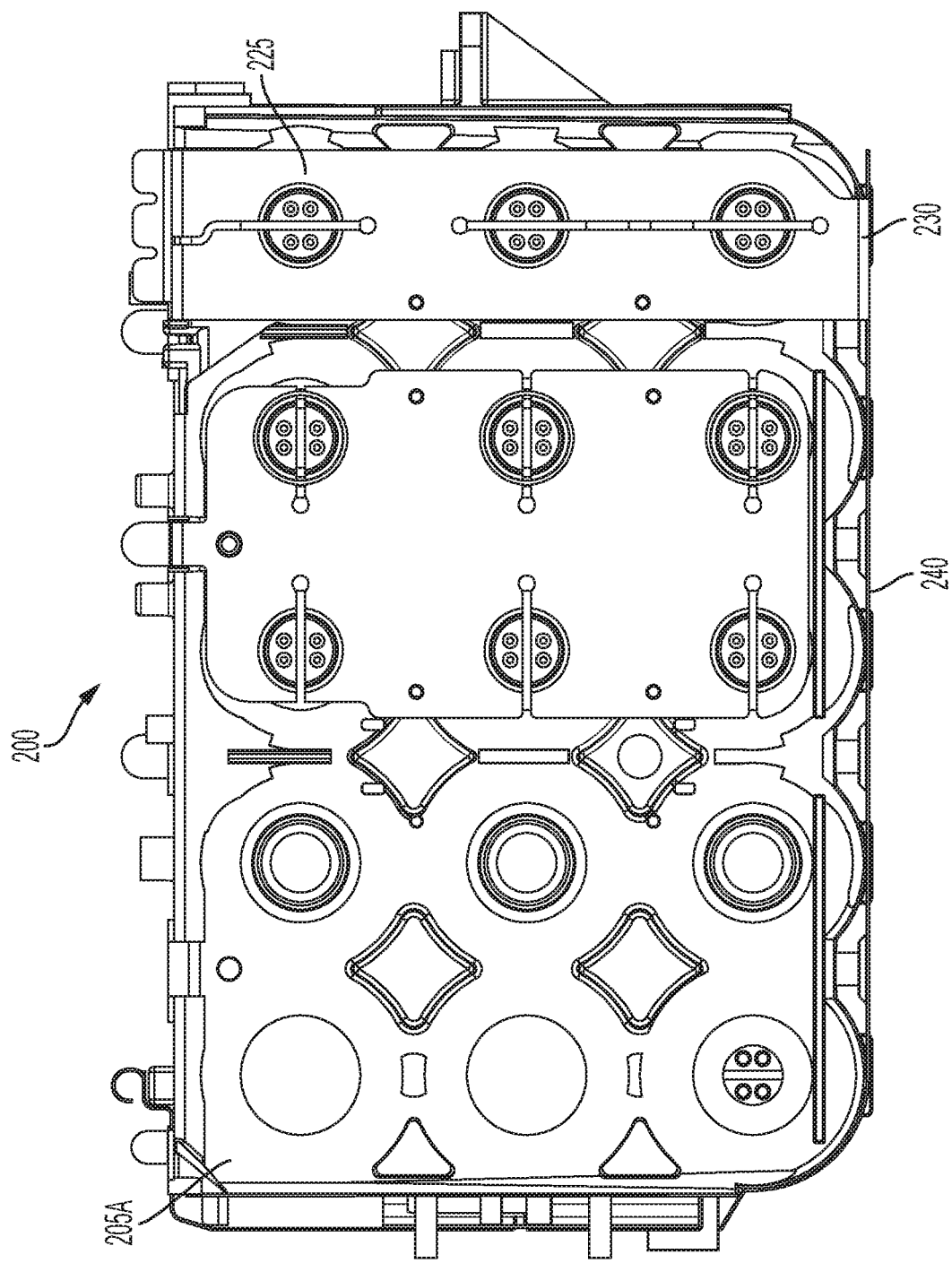
FIG. 11 is a side view of the core battery assembly of the core battery assembly of FIG. 5.
Figure 12:
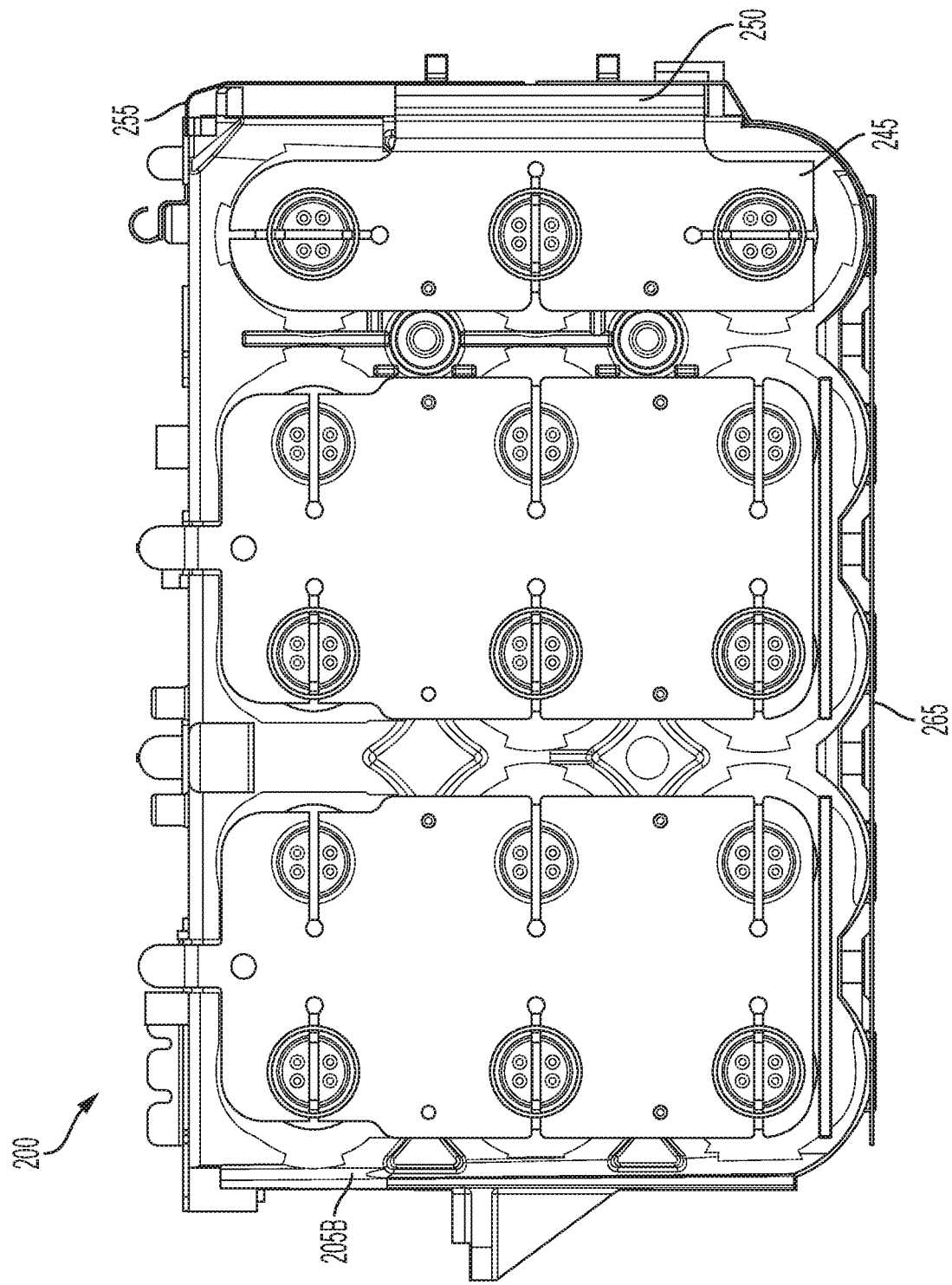
FIG. 12 is an opposite side view of the core battery assembly of FIG. 5 with a strap removed.
Figure 13:
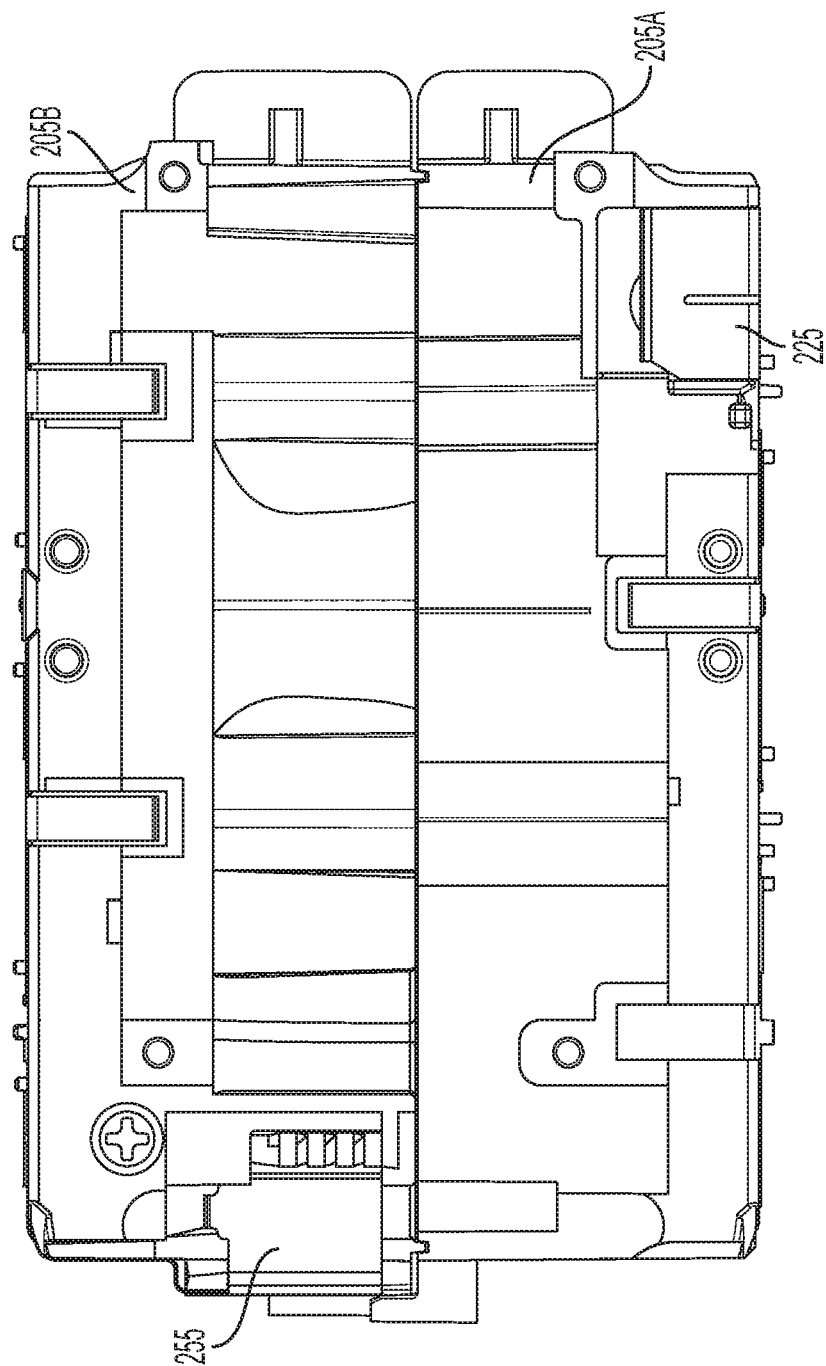
FIG. 13 is a top view of the core battery assembly as shown in FIG. 12.

With reference to FIGS. 7-9, a second weld strap 245 is connected to the most negative battery cells 210B. The second weld strap 245 includes an extended portion 250 that extends from a third side (opposite the first side) on which the second weld strap 245 is located to an adjacent side (a front side) of the core housing 205. A connecting strap 255 connects the extended portion 250 to the PCB on the top side of the core housing 205. A second lead wire (not shown) connects the connecting strap 255 to a negative power terminal 125.

A second sacrificial electrode 265 is connected to (e.g., welded (as shown), formed with, etc.) to the extended portion 250 on the front side of the core housing 205. The second sacrificial electrode 265 extends from the front side onto the bottom side of the core housing 205 (see FIG. 7). The strap 245, the extended portion 250, the connecting strap 255 and the sacrificial electrode 265 are assembled and connected (e.g., welded) to form a strap/electrode assembly.

Figure 14:
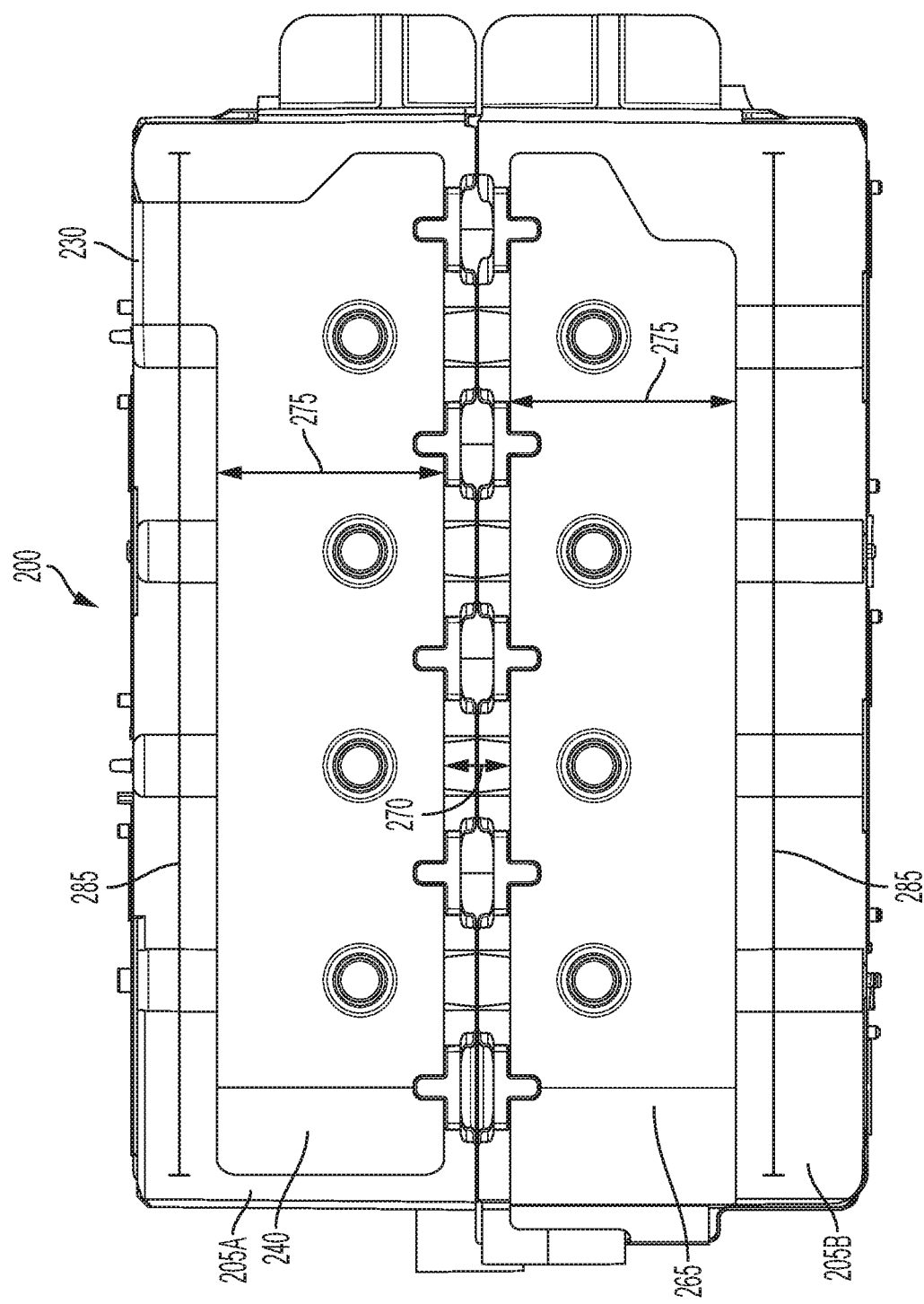
FIG. 14 is a bottom view of the core battery assembly of FIG. 5.

With reference to FIGS. 7 and 14, the first sacrificial electrode 240 and the second sacrificial electrode 265 are arranged to be in close proximity to each other on the bottom side of the core housing 205. A spacing 270 is provided between the sacrificial electrodes 240, 265 such that the electrodes 240, 265 do not come in contact during a normal operation of the battery pack 100. In some embodiments, the spacing 270 may be between about 4 mm and about 11 mm. In some embodiments, the spacing 270 is at least about 6 mm to about 8 mm.

The first sacrificial electrode 240 and the second sacrificial electrode 265 have a width 275 and a length 285. In some embodiments, the width 275 may be between about 10 mm and about 35 mm (e.g., between about 15 mm and about 30 mm (about 27.5 mm)). In some embodiments, the width 275 is at least about 18.5 mm. In some embodiments, the length 285 may be between about 80 mm and about 110 mm (e.g., between about 90 mm and about 100 mm). In other embodiments, the length 285 may be between 170 mm and about 210 mm (e.g., between about 180 mm and about 200 mm). The exemplary spacing 270 between and width 275 of the electrodes 240, 265 may be implemented on any type of battery pack (e.g., battery packs that include a single cell string (1P), two parallel cell strings (2P), three parallel cell strings (3P), etc.).

As mentioned above, the material of each sacrificial electrode 240, 265 may include electrically-conductive single, compound, or alloy elements or combinations thereof (e.g., Zn, Sn, Ni, Fe, Cr, Al, Cu. NiCu, NiCr, CuSn, FeCr, NiAl, CuMg, CuCr, SnZn).

Figure 15:
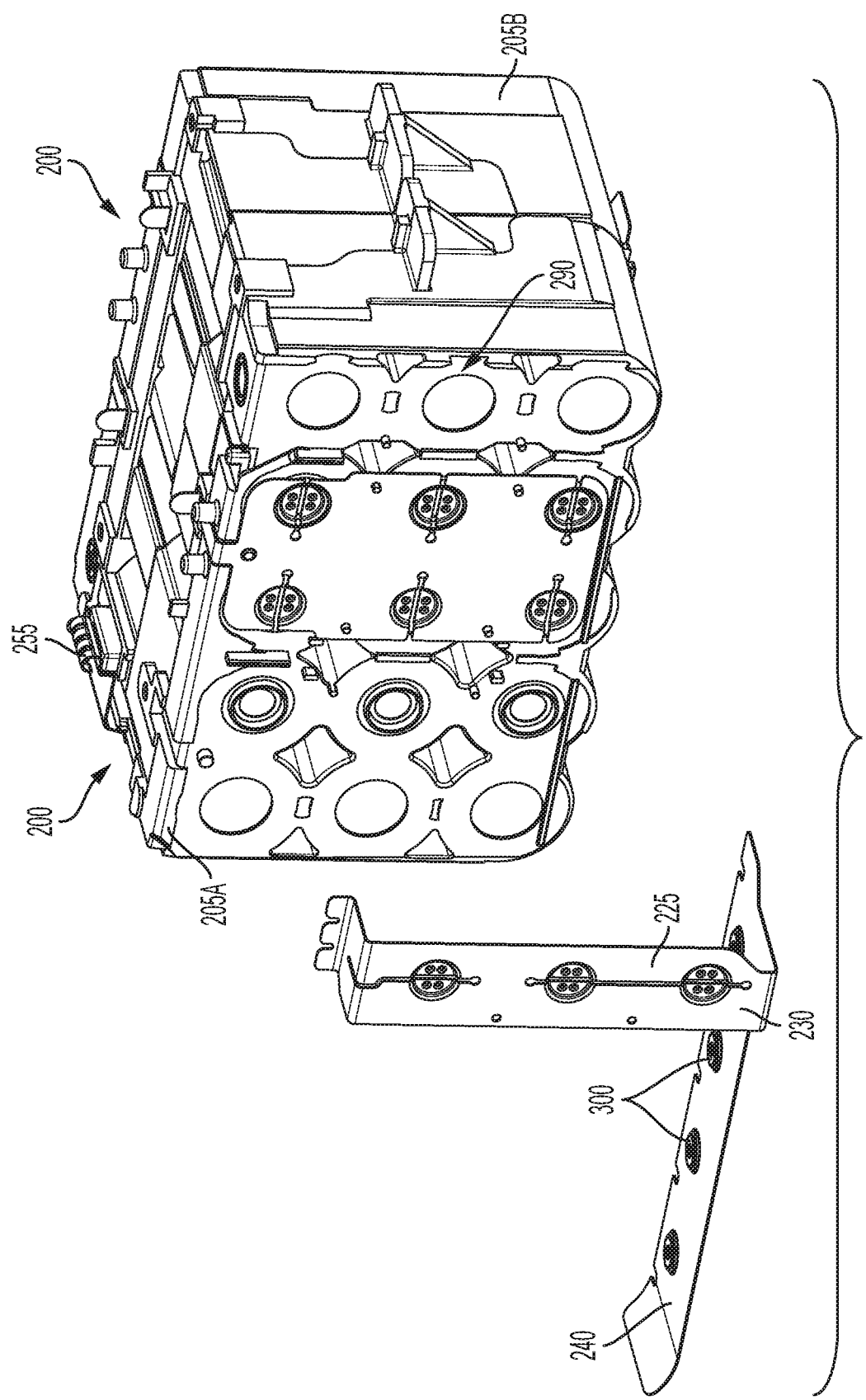
FIG. 15 is a perspective view of the core battery assembly as shown in FIG. 12 with a strap/sacrificial electrode assembly exploded.
Figure 16:
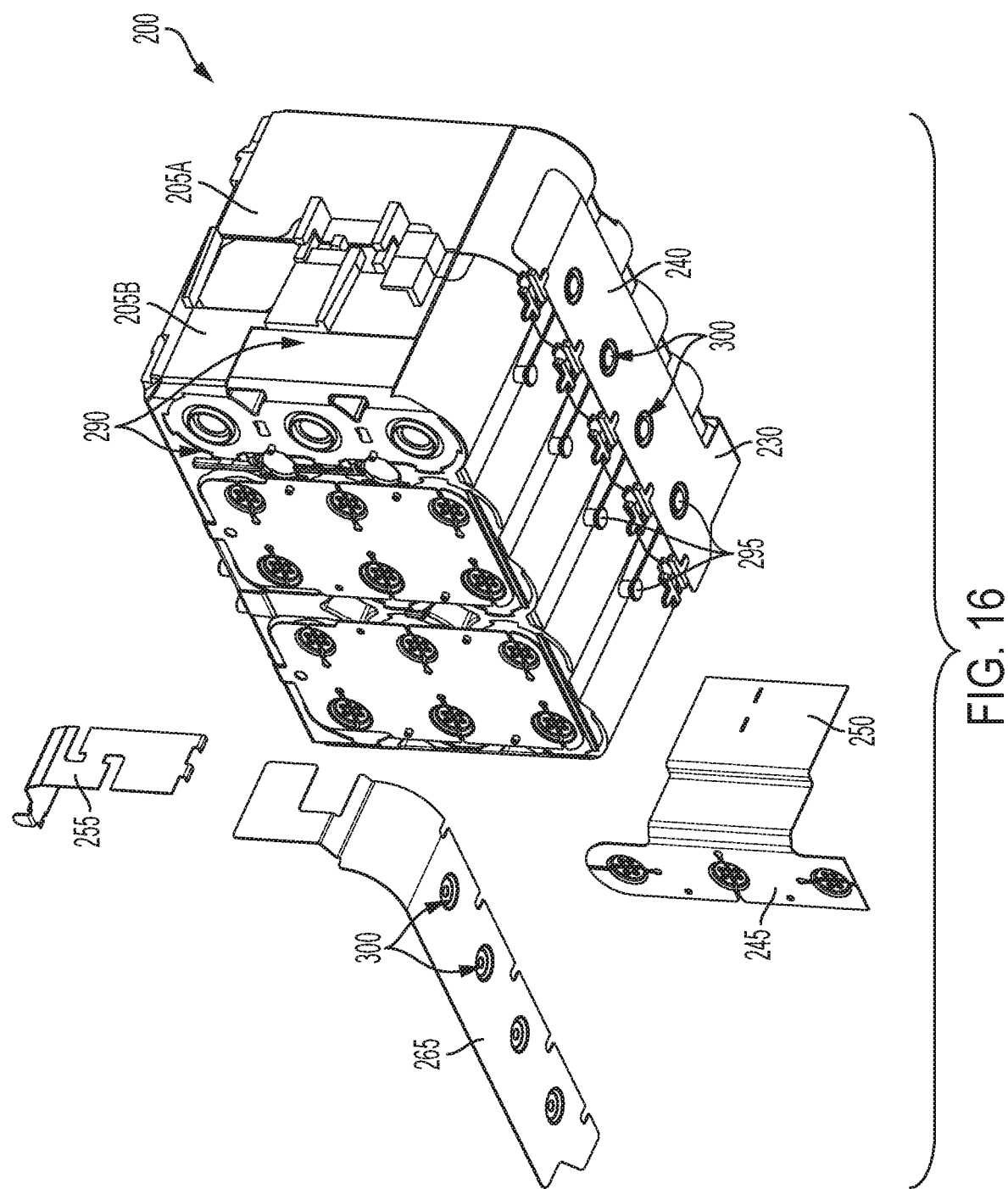
FIG. 16 is a perspective view of the core battery assembly of FIG. 5 with another strap/sacrificial electrode assembly exploded.
Figure 17:
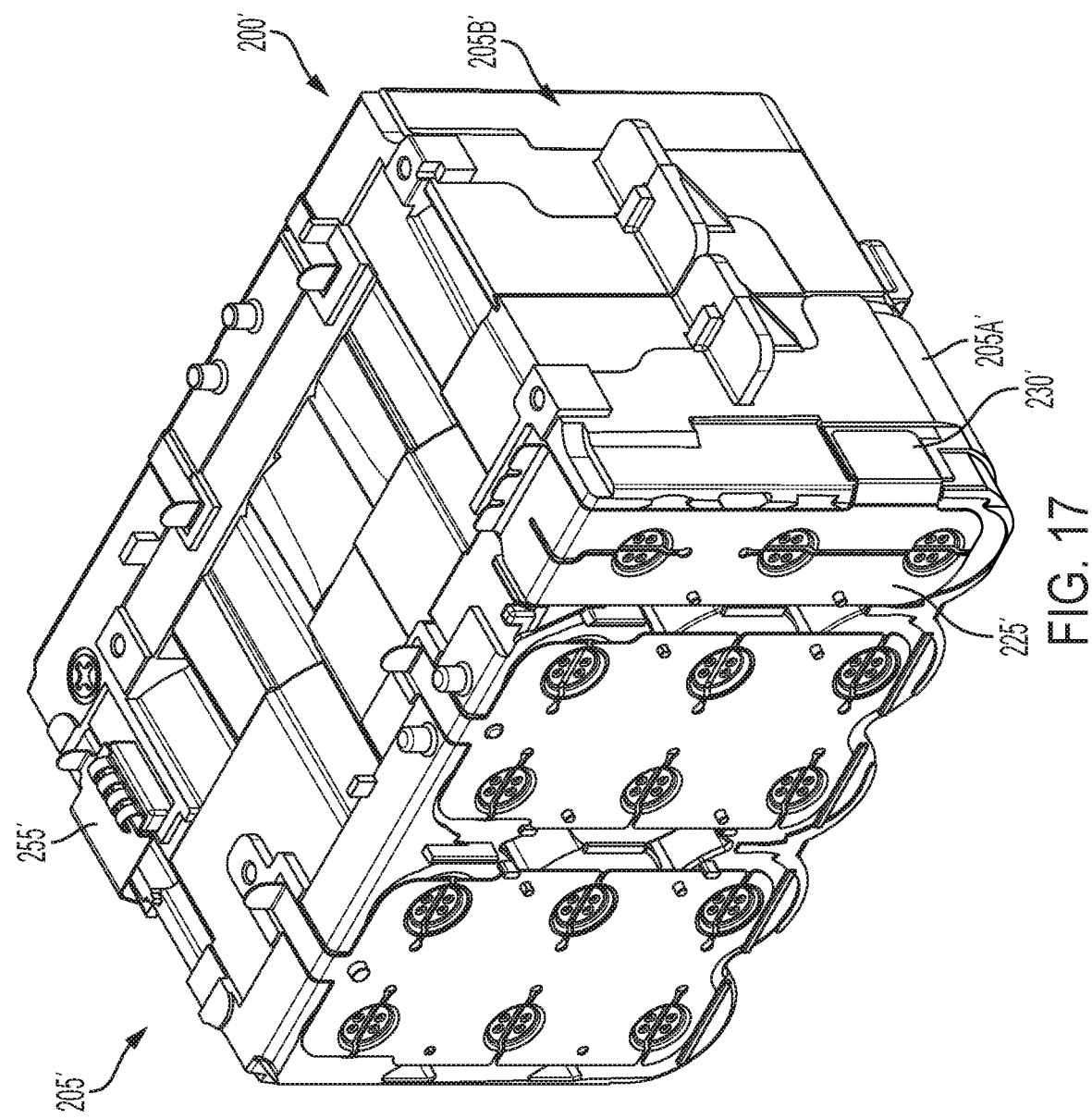
FIG. 17 is a perspective view of an alternative construction of a core battery assembly.
Figure 18:
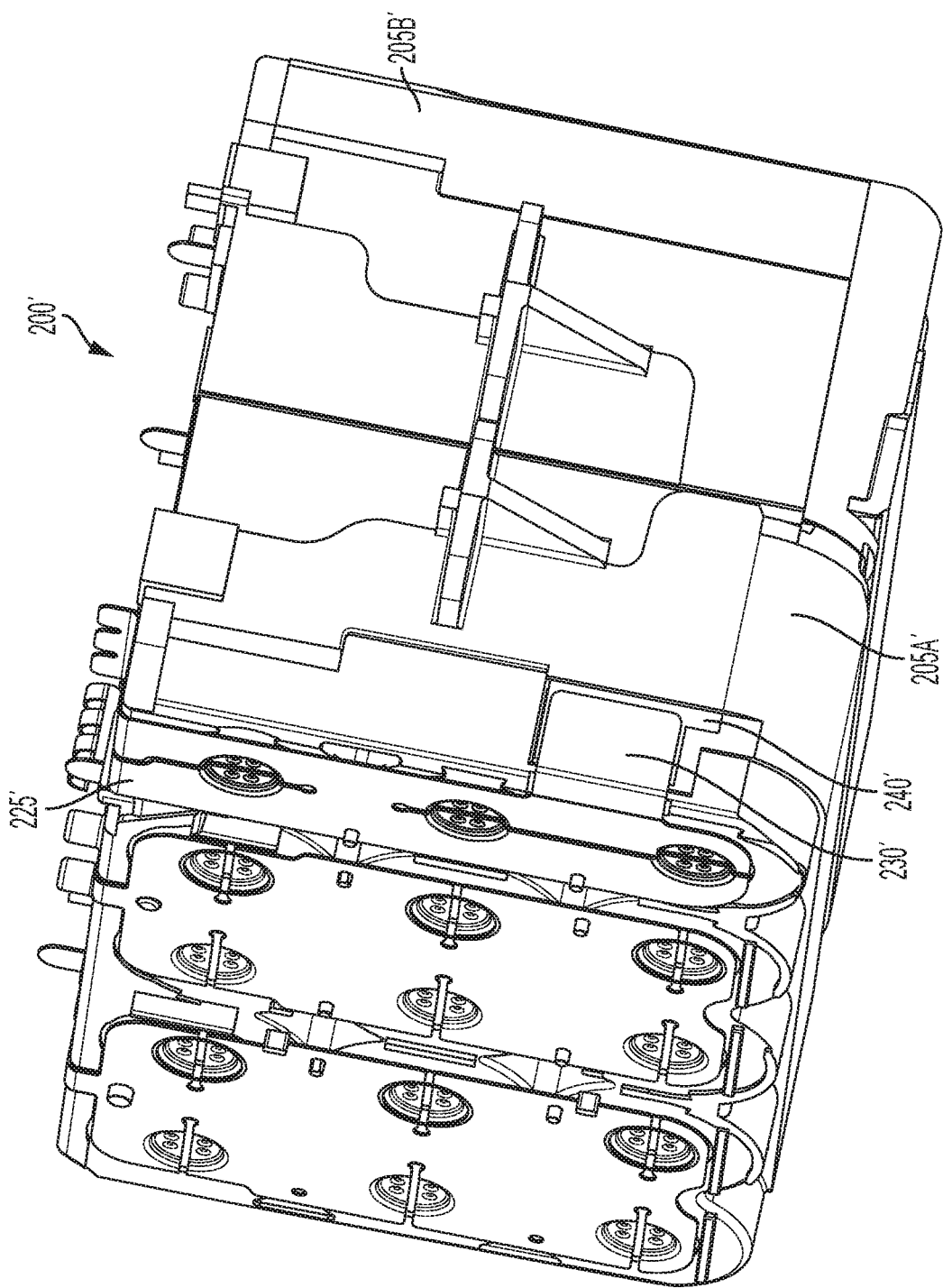
FIG. 18 is another perspective view of the core battery assembly of FIG. 17.
Figure 19:
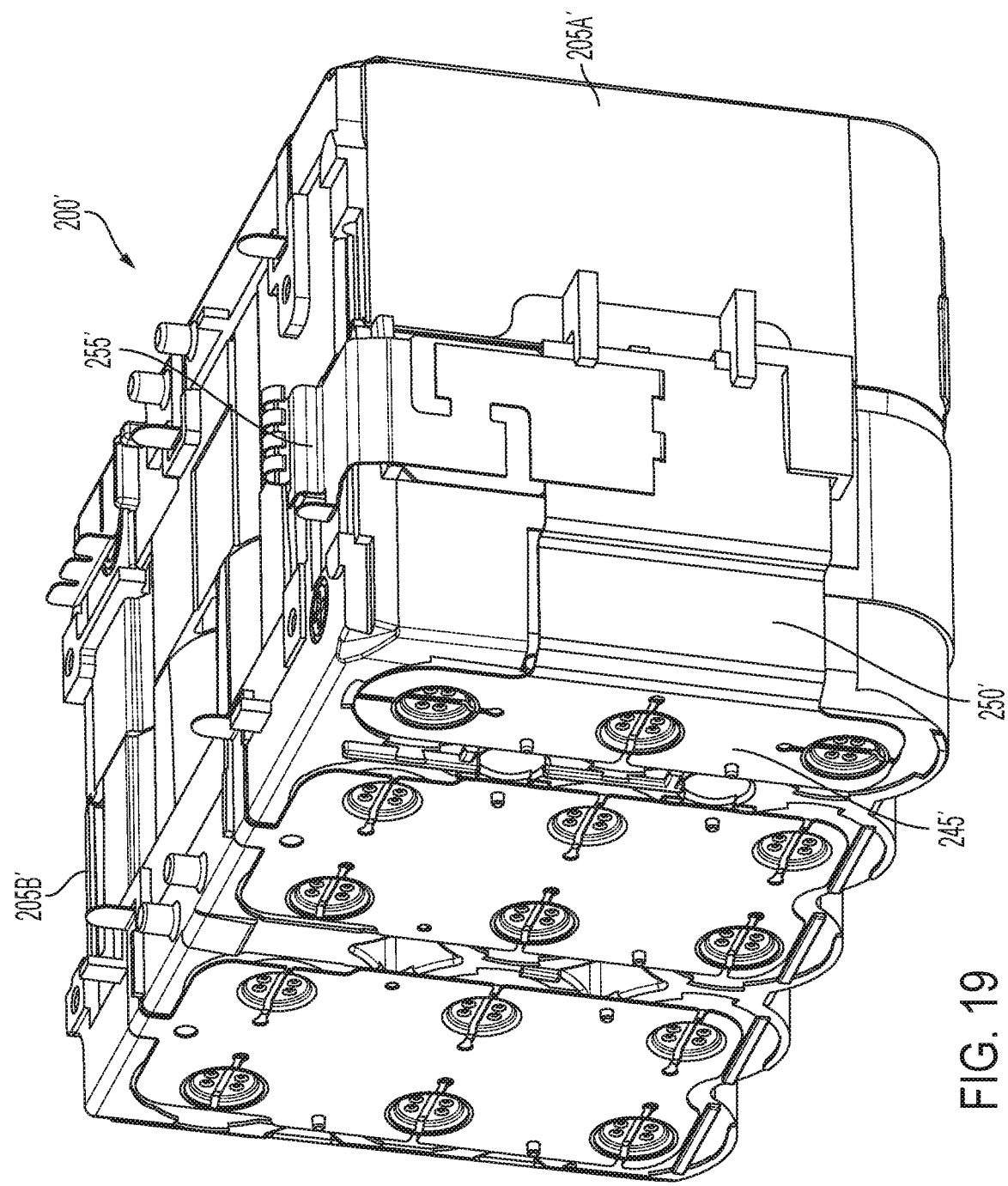
FIG. 19 is another perspective view of the core battery assembly of FIG. 17.
Figure 20:
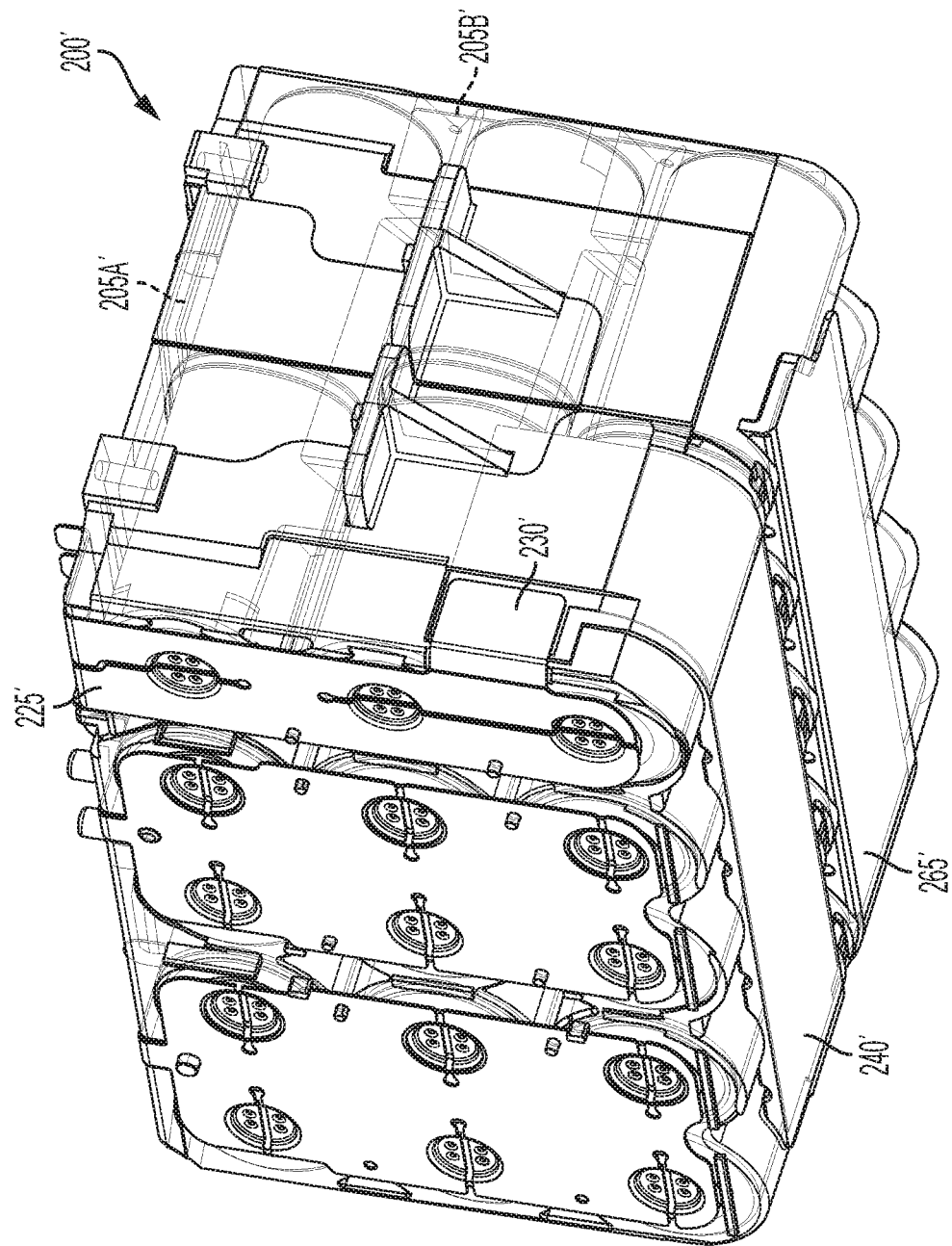
FIG. 20 is a perspective view of the core battery assembly of FIG. 17 with the core housing assembly illustrated as transparent.
Figure 21:
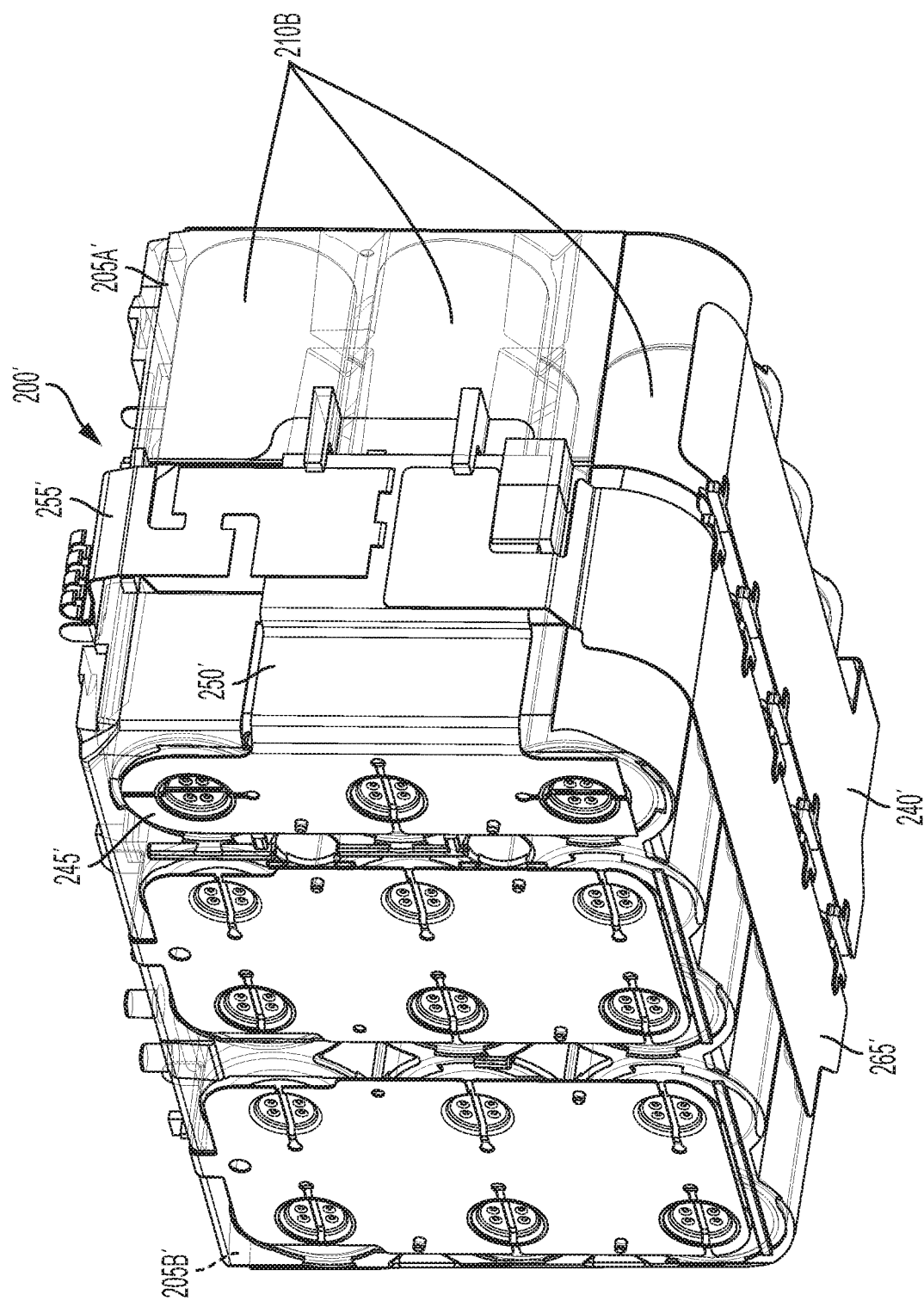
FIG. 21 is another perspective view of the core battery assembly as shown in FIG. 20.
Figure 22:
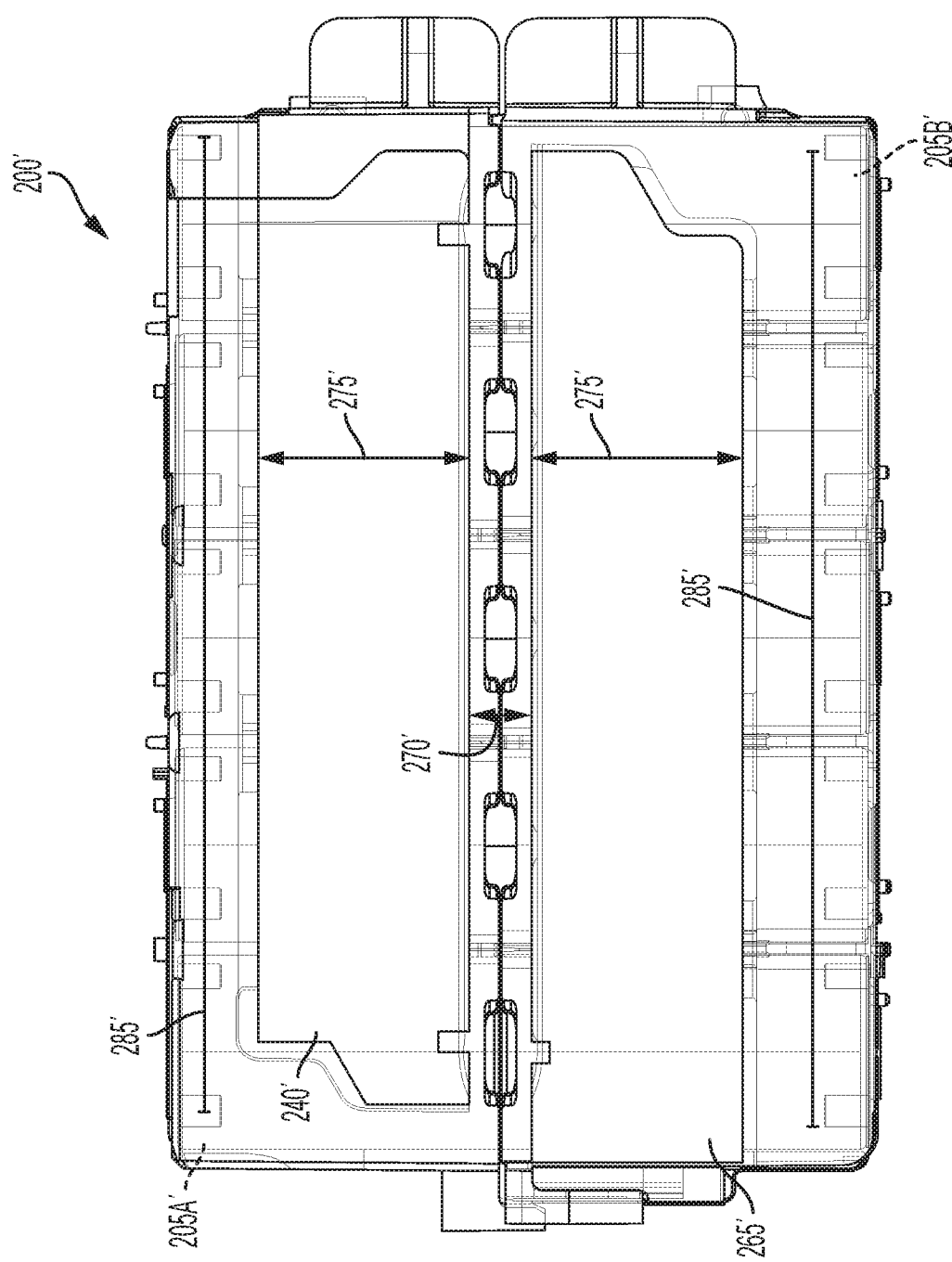
FIG. 22 is a bottom view of the core battery assembly as shown in FIG. 20.
Figure 23:
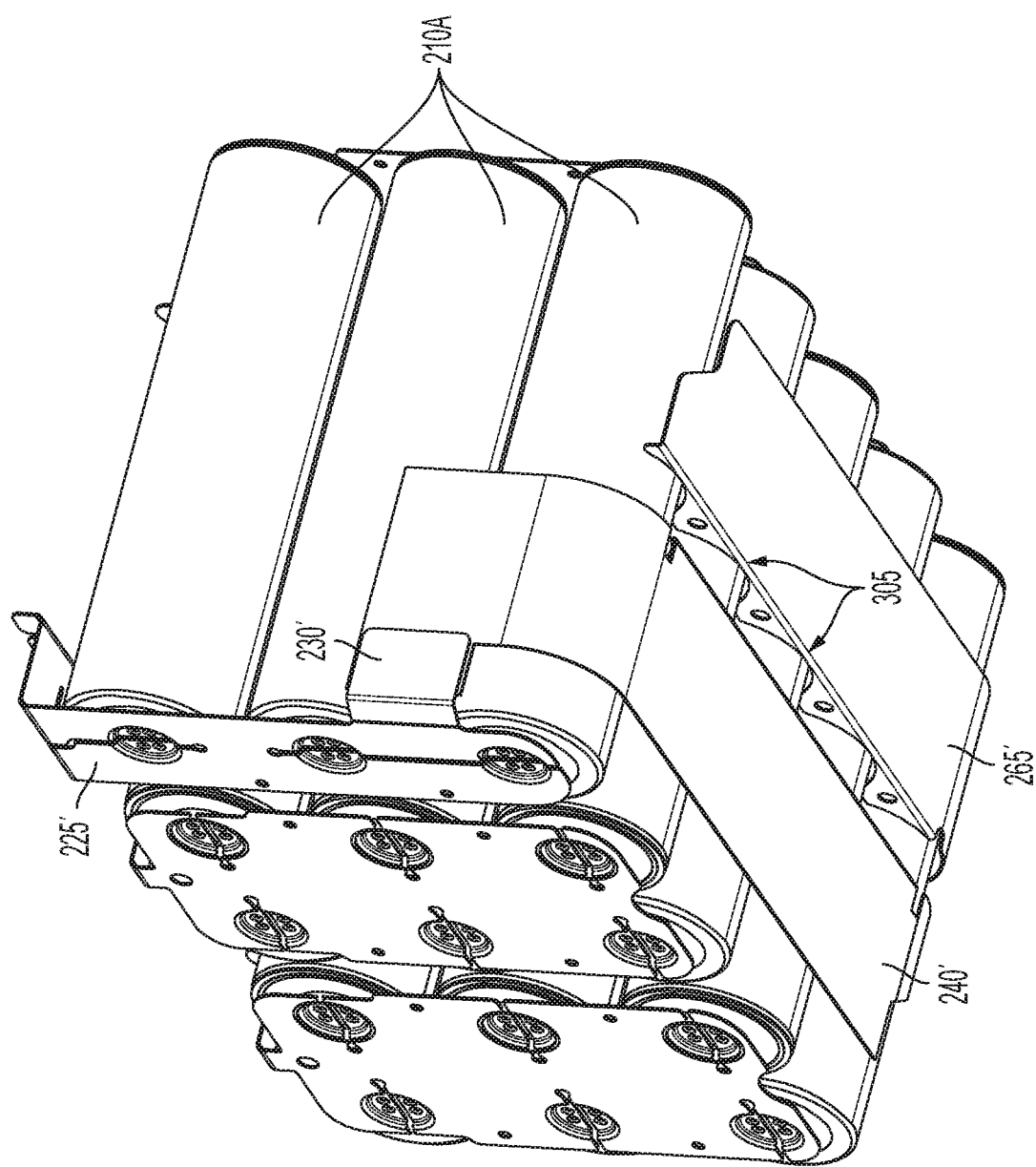
FIG. 23 is a perspective view of the core battery assembly of FIG. 17 with the core housing assembly removed.
Figure 24:
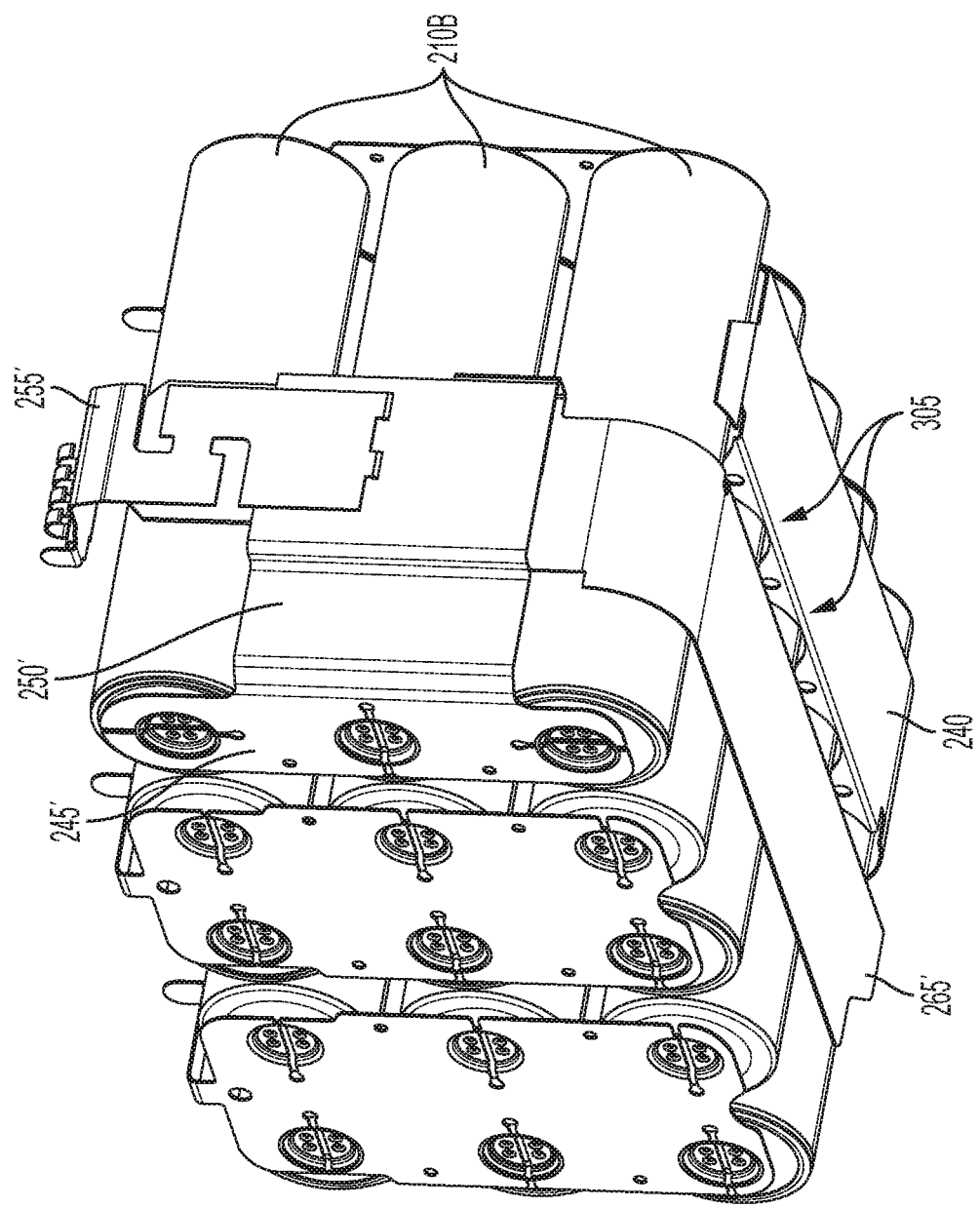
FIG. 24 is another perspective view of the core battery assembly as shown in FIG. 23.
Figure 25:
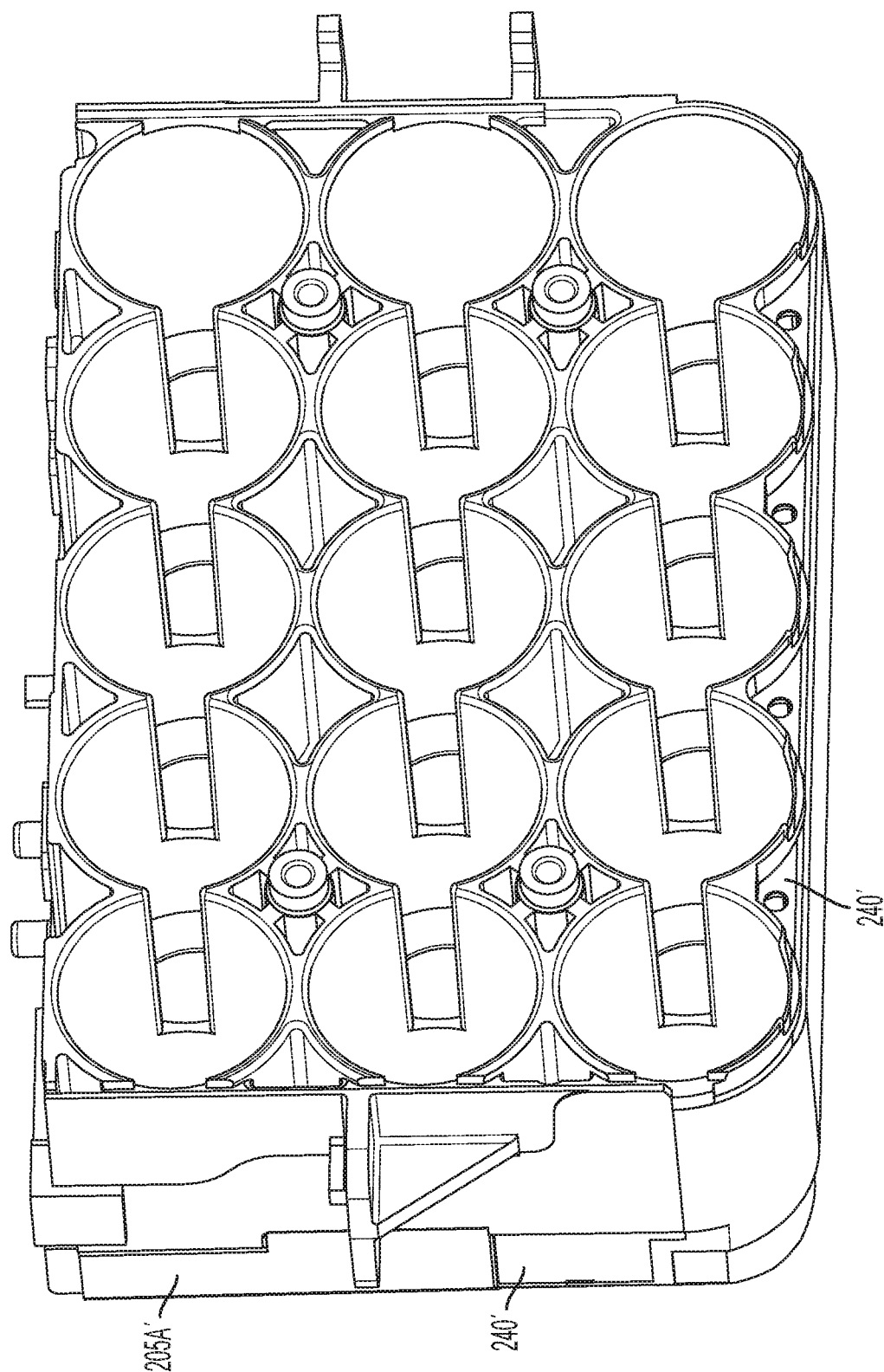
FIG. 25 is a perspective view of a portion of the core housing assembly and a strap/sacrificial electrode assembly.
Figure 26:
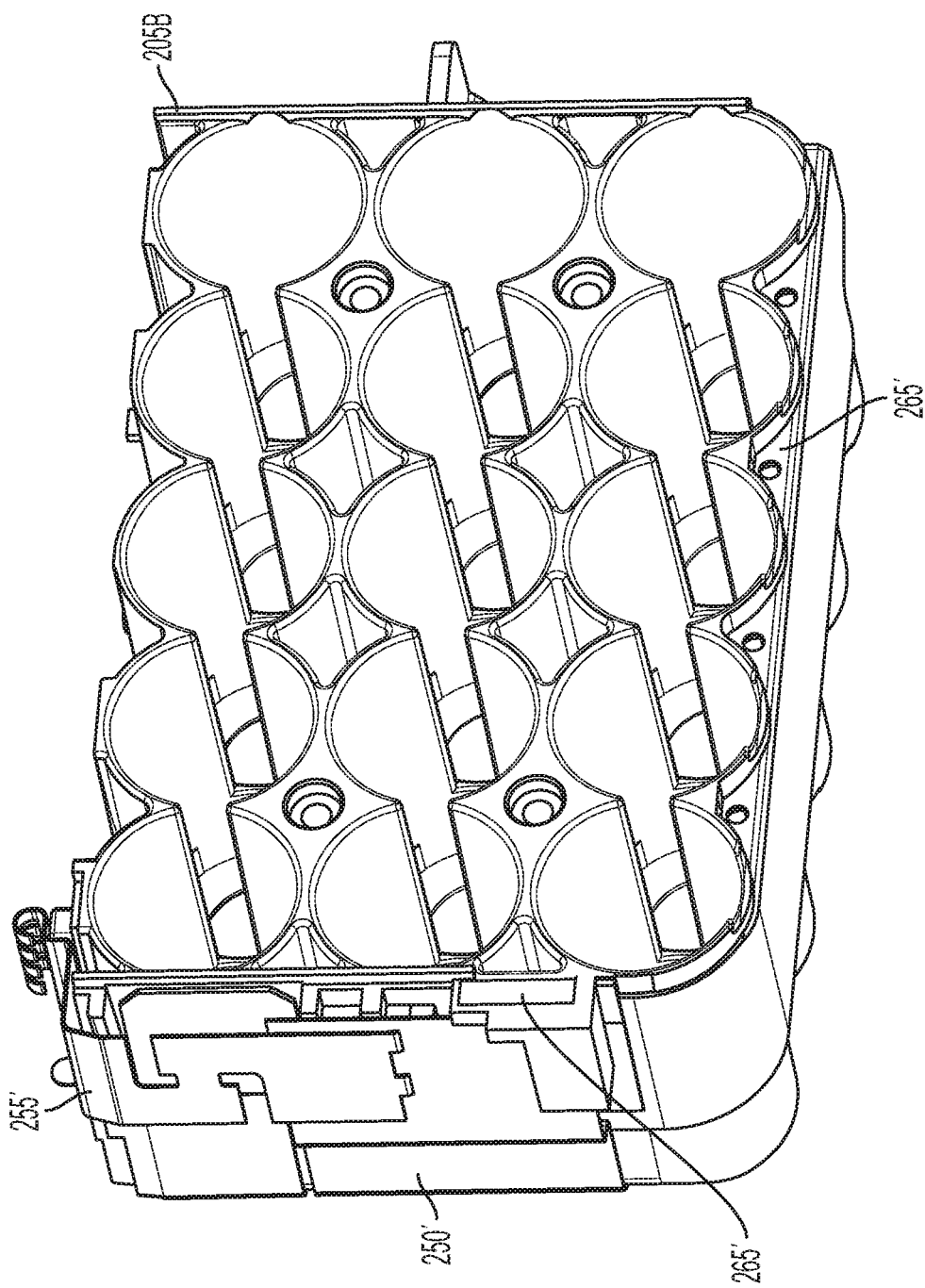
FIG. 26 is a perspective view of the other portion of the core housing assembly and the other strap/sacrificial electrode assembly.

The core housing 205 is constructed to support the strap/electrode assemblies. In the illustrated construction (see FIGS. 15-16), the core housing 205 defines recesses 290 to receive portions of each strap/electrode assembly. On the bottom side, each housing portion 205A, 205B includes standoffs or projections 295 engaging the associated sacrificial electrode 240, 265 (e.g., in complementary openings 300).

The sacrificial electrodes 240, 265 minimize damage to components of the battery pack 100 in case of ingress of an electrically-conductive and/or chemically-corrosive fluid or moisture (e.g., salt water, salt fog, etc.; again, referred to as an "ingress fluid"). When an ingress fluid enters the battery pack 100, the ingress fluid may short circuit the battery cells 210. When the battery cells 210 hold a charge, this short circuit may cause overheating in and/or irreversible damage to the battery cell 210 and the battery pack 100. For example, depending on voltages of the battery cells 210, corrosion status, extent of a short circuit between one or more battery weld straps and battery cells 210, etc., shorting may cause corrosion, overheating in the battery cells 210, thermal runaway, meltdown of the battery housing 205, etc.

The spacing 270 between the sacrificial electrodes, 240, 265 is selected such that an ingress fluid entering the battery pack 100 first shorts the sacrificial electrodes 240, 265. That is, the ingress fluid forms an electrical connection between the sacrificial electrodes 240, 265 forming a short circuit between the positive power terminal 120 and the negative power terminal 125 of the battery pack 100. This short circuit discharges the battery cells 210 before the ingress fluid or its associated conductive or corrosive elements can enter the battery cells 210, cause excessive short circuiting between the battery weld straps and the battery cells 210 and cause thermal runaway, excessive heating, etc.

Generally, when fluid or moisture enters the battery pack 100, the fluid/moisture settles at the bottom of the housing 105 of the battery pack 100. In the core battery assembly 200, the sacrificial electrodes 240, 265 are therefore placed on the bottom side of the core battery assembly 200 abutting the bottom surface of the battery pack housing 105. The illustrated placement of the sacrificial electrodes 240, 265 allows ingress fluid mainly to short circuit the sacrificial electrodes 240, 265, to quickly reduce the energy of the battery cells 210, before coming into contact with other components of the battery pack 100.

FIGS. 17-26 illustrate an alternative construction of a core battery assembly 200'. The core battery assembly 200' is similar to the core battery assembly 200 shown in FIGS. 5-16, and common elements have the same reference number "'".

In the illustrated core battery assembly 200', the sacrificial electrodes 240', 265' are supported in the core housing 205'. In the illustrated construction, the sacrificial electrodes 240', 265' are molded with the housing portions 205A', 205B'. In other constructions (not shown), the housing portions 205A', 205B' may define an opening, recess, groove, etc. receiving and retaining the associated sacrificial electrode 240', 265'.

The sacrificial electrode 240' extends from inside the housing portion 205A' through an opening to connect to (e.g., via welding) the extended portion 230' of the weld strap 225'. Similarly, the sacrificial electrode 265' extends from inside the housing portion 205B' to connect to (e.g., via welding) the connecting strap 255' and the extended portion 250' of the weld strap 245'.

The illustrated sacrificial electrodes 240', 265' have portions 305 contoured to the shape of the cells 210. The sacrificial electrodes 240', 265' have a similar spacing 270', width 275' and/or length 285', as described above.

As with the sacrificial electrodes 240, 265, the sacrificial electrodes 240', 265' minimize damage to components of the battery pack 100 in case of an ingress fluid. When fluid enters the core housing 205', the fluid settles at the bottom of the core housing 205', the sacrificial electrodes 240', 265' are placed at the bottom of the core housing 205'. The illustrated placement of the sacrificial electrodes 240', 265' allows the ingress fluid to mainly short the sacrificial electrodes 240', 265', to quickly reduce the energy of the battery cells 210', before coming into contact with other components of the battery pack 100'.

Although the invention has been described in detail with reference to certain preferred embodiments, variations and modifications exist within the scope and spirit of one or more independent aspects of the invention as described.

One or more independent features and/or independent advantages of the invention may be set forth in the following claims:

What is claimed is:

1. A battery pack comprising:
   a housing;
   a terminal block; and
   a core battery assembly supported in the housing, the core battery assembly including
      a core housing,
      a plurality of battery cells supported in the core housing,
      a first weld strap connecting the plurality of battery cells to a positive power terminal,
      a second weld strap connecting the plurality of battery cells to a negative power terminal,
      a first sacrificial electrode connected to the first weld strap, and
      a second sacrificial electrode connected to the second weld strap;
   wherein a spacing between the first sacrificial electrode and the second sacrificial electrode is such that an ingress fluid entering the battery pack electrically shorts the first sacrificial electrode and the second sacrificial electrode to drop a voltage of the cell battery assembly and discharge battery energy before damaging the battery cells.

2. The battery pack of claim 1, wherein the spacing is between about 4 millimeters (mm) and about 11 mm.

3. The battery pack of claim 2, wherein the spacing is at least about 6 mm to about 8 mm.

4. The battery pack of claim 1, wherein each of the first sacrificial electrode and the second sacrificial electrode have a width, each width being between about 10 mm and about 35 mm.

5. The battery pack of claim 1, wherein each of the first sacrificial electrode and the second sacrificial electrode have a width, each width being at least about 27.5 mm.

6. The battery pack of claim 1, wherein each of the first sacrificial electrode and the second sacrificial electrode have a length, each length being between about 80 mm and about 110 mm.

7. The battery pack of claim 6, wherein each length is between about 90 mm and about 100 mm.

8. The battery pack of claim 1, wherein the first sacrificial electrode and the second sacrificial electrode are positioned outside of the core housing.

9. The battery pack of claim 1, wherein the first sacrificial electrode and the second sacrificial electrode are positioned substantially inside of the core housing.

10. A battery pack comprising:
    a housing;
    a terminal block; and
    a core battery assembly supported in the housing, the core battery assembly including
       a core housing,
       a plurality of battery cells supported in the core housing,
       a first weld strap connecting the plurality of battery cells to a positive power terminal,
       a second weld strap connecting the plurality of battery cells to a negative power terminal,
       a first sacrificial electrode connected to the first weld strap, and
       a second sacrificial electrode connected to the second weld strap;
    wherein a spacing between the first sacrificial electrode and the second sacrificial electrode is between about 4 millimeters (mm) and about 11 mm.

11. The battery pack of claim 10, wherein each of the first sacrificial electrode and the second sacrificial electrode have a width, each width being between about 10 mm and about 35 mm.

12. The battery pack of claim 10, wherein each of the first sacrificial electrode and the second sacrificial electrode have a width, each width being at least about 27.5 mm.

13. The battery pack of claim 10, wherein each of the first sacrificial electrode and the second sacrificial electrode have a length, each length being between about 80 mm and about 110 mm.

14. The battery pack of claim 10, wherein the first sacrificial electrode and the second sacrificial electrode are positioned outside of the core housing.

15. The battery pack of claim 10, wherein the first sacrificial electrode and the second sacrificial electrode are positioned substantially inside of the core housing.

16. A battery pack comprising:
a housing;
a terminal block; and
a core battery assembly supported in the housing, the core battery assembly including
a core housing,
a plurality of battery cells supported in the core housing,
a first weld strap connecting the plurality of battery cells to a positive power terminal,
a second weld strap connecting the plurality of battery cells to a negative power terminal,
a first sacrificial electrode connected to the first weld strap, and
a second sacrificial electrode connected to the second weld strap;
wherein a spacing between the first sacrificial electrode and the second sacrificial electrode is such that an ingress fluid entering the battery pack electrically shorts the first sacrificial electrode and the second sacrificial electrode to drop a voltage of the cell battery assembly and discharge battery energy before damaging the battery cells, and
wherein the first sacrificial electrode and the second sacrificial electrode are positioned substantially inside of the core housing.

17. The battery pack of claim 16, wherein the spacing is between about 4 millimeters (mm) and about 11 mm.

18. The battery pack of claim 16, wherein each of the first sacrificial electrode and the second sacrificial electrode have a width, each width being between about 10 mm and about 35 mm.

19. The battery pack of claim 16, wherein each of the first sacrificial electrode and the second sacrificial electrode have a width, the width being at least about 27.5 mm.

20. The battery pack of claim 16, wherein each of the first sacrificial electrode and the second sacrificial electrode have a length, each length being between about 80 mm and about 110 mm.

* * * * *